(12) United States Patent
Hurst et al.

(10) Patent No.: US 8,633,265 B2
(45) Date of Patent: Jan. 21, 2014

(54) UV STABILIZATION OF ISOSORBIDE POLYCARBONATES

(75) Inventors: Jeremy David Hurst, Rotterdam (NL); Roland Assink, Vlissingen (NL); Hans de Brouwer, Oisterwijk (NL)

(73) Assignee: Sabic Innovative Plastics IP B.V., Bergen OP Zoom (NL)

( * ) Notice: Subject to any disclaimer, the term of this patent is extended or adjusted under 35 U.S.C. 154(b) by 103 days.

(21) Appl. No.: 13/009,695

(22) Filed: Jan. 19, 2011

(65) Prior Publication Data

US 2012/0184651 A1    Jul. 19, 2012

(51) Int. Cl.
| | |
|---|---|
| *C08K 5/34* | (2006.01) |
| *C08K 3/10* | (2006.01) |
| *C08K 3/22* | (2006.01) |
| *C08K 5/07* | (2006.01) |
| *C08K 5/315* | (2006.01) |
| *C08K 5/3417* | (2006.01) |
| *C08K 5/3492* | (2006.01) |

(52) U.S. Cl.
USPC ............ 524/91; 524/99; 524/100; 524/102; 524/205; 524/356; 524/413

(58) Field of Classification Search
USPC .............. 524/91, 99, 413, 100, 102, 205, 356
See application file for complete search history.

(56) References Cited

U.S. PATENT DOCUMENTS

| 7,666,972 B2 | 2/2010 | Jansen et al. |
| 2004/0180997 A1 | 9/2004 | Pearson |
| 2010/0216917 A1* | 8/2010 | Malinoski et al. ............ 524/100 |

FOREIGN PATENT DOCUMENTS

WO    2009/012391 A1    1/2009

OTHER PUBLICATIONS

Anonymous, "Hindered amine light stabilizers for polycarbonates," Research Disclosure, Mason Publications, Hampshire, GB, vol. 354, No. 35, Oct. 1, 1993, five pages.

\* cited by examiner

*Primary Examiner* — Kriellion Sanders
(74) *Attorney, Agent, or Firm* — Michael Best & Friedrich LLP

(57) ABSTRACT

Provided herein are polymeric compositions that are suitable protected from UV-induced discoloration and degradation. Such resins comprise an isosorbide polymer and one or more hindered amines. These resin compositions are useful in the manufacture of various shaped, formed and/or molded articles.

24 Claims, No Drawings

UV STABILIZATION OF ISOSORBIDE POLYCARBONATES

FIELD OF THE INVENTION

The present invention relates to the development and use of UV stable, isosorbide-based polymer compositions.

BACKGROUND OF THE INVENTION

There is a demand for bio-sourced materials as a more environmentally friendly means to construct products. Isosorbides are derived from biologically based sources, namely sugars, rather than from the petroleum feed stocks used to prepare other polymer structural units. Isosorbide-based materials and products have a low net environmental impact, and can be utilized as renewable resources by the plastic manufacturing industry. These materials and products can be used for the production of polymeric materials such as polycarbonates. Polycarbonates are used in hundreds of applications such as eyeglass lenses and optical media, where their transparency and tough physical properties are beneficial.

Light induced degradation is a general problem for all polycarbonate polymers both non-isosorbide base and isosorbide base polymers. The originally ductile polycarbonate becomes brittle due to accelerated chain scission of the polycarbonate due to UV radiation. The degradation of these polymers occurs at the surface of the material. Light stabilizers may be used, but limited choices are available in order to avoid negatively influencing processability (i.e., decrease melt viscosity by molecular weight degradation), and long term thermal aging. HALS in polymers have been used as UV stabilizers as well in polyolefins (polyethylene, polypropylene). Some of them have been marketed as flame retardants as well for these polymers. The only previous HALS used in polycarbonates were piperazinone based HALS for the purpose of acting as a flame retardant and do not provide sufficient UV protection. In non-isosorbide-based polycarbonates, use of sterically hindered amines (HALS) is excluded as HALS dramatically accelerate hydrolysis of polycarbonates.

Accordingly, there is a clear need to provide polymeric compositions that are suitably protected from UV-induced discoloration and degradation.

SUMMARY OF THE INVENTION

Provided herein is a composition comprising an isosorbide polymer and one or more hindered amines. The one or more hindered amines (HALS) may have a formula selected from the group consisting of:

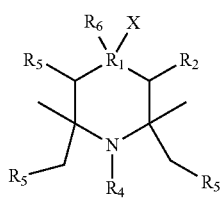

(II)

wherein $R^1$ is C, X is H, and $R^2$ is H; wherein $R_4$ is hydrogen, oxyl, hydroxyl, alkyl of 1 to 20 carbons, alkenyl or alkynyl of 3 to 8 carbons, aralkyl of 7 to 12 carbons, aliphatic acyl of 1 to 10 carbons, aromatic acyl of 7 to 13 carbons, alkoxycarbonyl of 2 to 9 carbons, aryloxycarbonyl of 7 to 15 carbons, alkyl, aryl, cycloalkyl or aralkyl substituted carbamoyl of 2 to 13 carbons, hydroxyalkyl of 1 to 5 carbons, 2-cyanoethyl, epoxyalkyl of 3 to 10 carbons, or a polyalkylene oxide group of 4 to 30 carbons;

$R_5$ is hydrogen or alkyl of 1 to 4 carbons;
$R_6$ is hydrogen, hydroxyl, or alkoxy of 1 to 4 carbons,

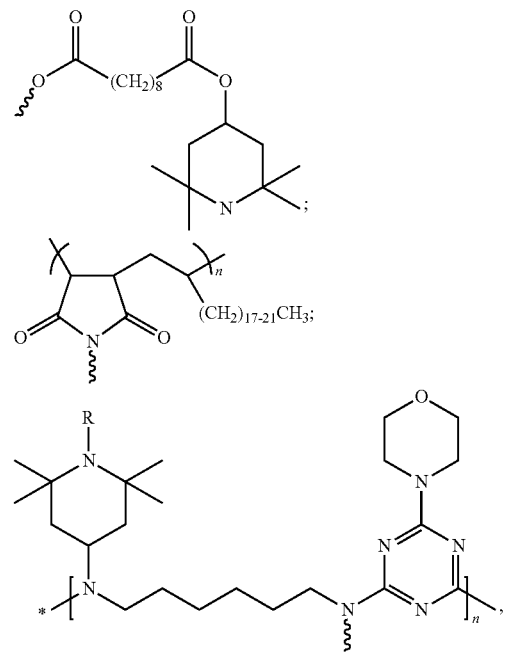

wherein R is methyl or acyl; or

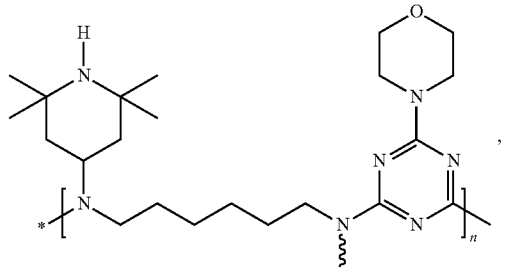

wherein when $R_6$ is hydrogen, X is a divalent radical selected from $-Z-R_7-C(=O)-N(R_8)-$, $-Z-C(=O)-N(R_8)-Z-C(=O)-R_9-C(=O)-N(R_8)-C(=O)-N(R_8)-$, or $-C(=O)-N(R_8)-$, Z is $-O-$, $-N(R_{10})-$, or $-N(R_{12})-R11-N(R_{12})-$, when R6 is hydroxyl or alkoxy, X is a divalent radical selected from $-R_7-C(=O)-N(R8)-$ or $-C(=O)-N(R8)-$, R7 is an alkylene diradical of 1 to 4 carbons, R8 is selected from hydrogen, primary or secondary alkyl of 1 to 8 carbons, aralkyl of 7 to 12 carbons, or cycloalkyl of 5 to 12 carbons, R9 is selected from a direct bond or the following substituted or unsubstituted radicals of alkylene of 1 to 14 carbons, oxydialkylene of 4 to 10 carbons, thiodialkylene of 4 to 10 carbons, alkenylene of 2 to 10 carbons, o, m, or p-phenylene, wherein the substituents for R9 are selected from lower alkyl, lower alkoxy, hydroxy, bromine, chlorine, mercapto, or lower alkylmercapto.

R10 and R.12 are selected from hydrogen, alkyl of 1 to 10 carbons, aryl of 6 to 12 carbons, aralkyl of 7 to 12 carbons, and cycloalkyl of 5 to 12 carbons, R10 may be a radical of 2-cyanoethyl radical or a radical of the formula:

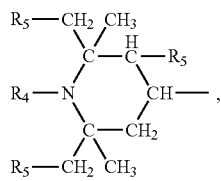

and

R11 is alkylene of 2 to 12 carbons.

The weight percent of HALS in the composition may be below 0.3%. The HALS may have a molecular weight of below 2000 g/mol.

The polymer in the composition may comprise at least 20 weight % of a biologically-based unit. The biologically-based unit may be isosorbide.

The isosorbide of the polymer may be derived from at least one of the following isosorbides: 1,4:3,6-dianhydro-D-sorbitol; 2,6-dioxabicyclo[3.3.0]octan-4,8-diol; 1,4:3,6-dianhydro-D-glucitol; 2,3,3a,5,6a-hexahydrofuro[3,2-b]furan-3,6-diol, or an isomer thereof. The polymer may be a homopolymer or a copolymer. The polymer may be a polycarbonate. The polycarbonate may be

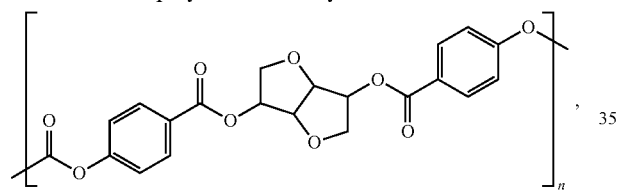

wherein n is greater than 1. The polycarbonate may be

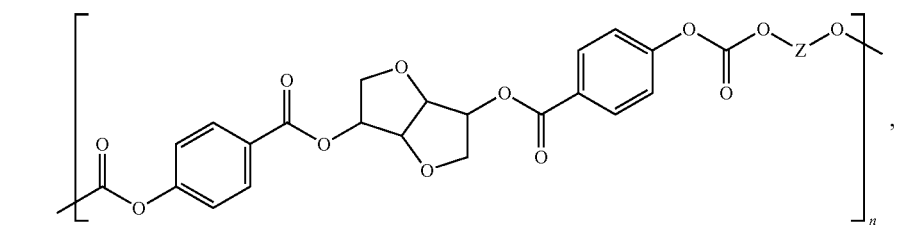

wherein z is an aromatic compound and n is greater than 1.

The composition may further comprise at least one impact modifier. The impact modifier may be a styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), styrene-acrylonitrile (SAN), or a combination thereof. The impact modifier may be MBS. The impact modifier may be SEBS.

The composition may also comprise at least one UV stabilizer. The UV stabilizer may be a hydroxybenzophenone, hydroxyphenyl benzotriazole, cyanoacrylate, oxanilide, hydroxyphenyl triazine, or a combination thereof.

Optionally, the composition may not comprise one or more of the following UV stabilizers:

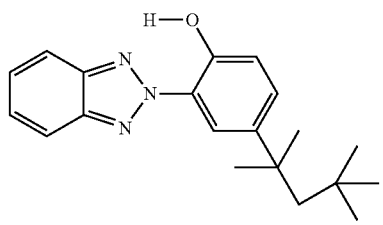 [SMILES: CC(C)(C)CC(C)(C)c1ccc(O)c(-n2nc3ccccc3n2)c1]

(also known as CYASORB® 5411 (Cytec) or TINUVIN® 329 (Ciba) (MW 323.4; mp 101-105));

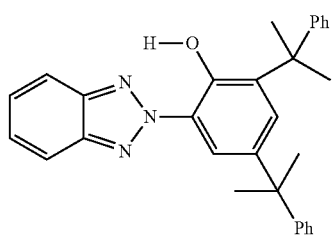 [SMILES: CC(C)(c1ccccc1)c1cc(-n2nc3ccccc3n2)c(O)c(C(C)(C)c2ccccc2)c1]

(also known as TINUVIN® 234 (Ciba) or TINUVIN® 900 (Ciba) (MW=447.6; mp=135-143);

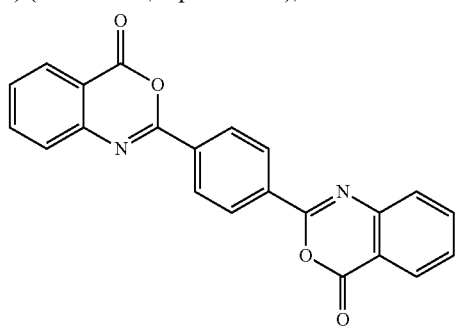

(CYASORB® UV-3638); and

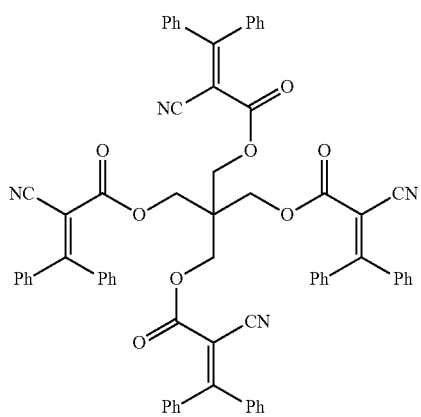 [SMILES: N#CC(C(=O)OCC(COC(=O)C(C#N)=C(c1ccccc1)c1ccccc1)(COC(=O)C(C#N)=C(c1ccccc1)c1ccccc1)COC(=O)C(C#N)=C(c1ccccc1)c1ccccc1)=C(c1ccccc1)c1ccccc1]

(UVINUL® 3030).

Provided herein is an article comprising the herein described composition comprising an isosorbide polymer and one or more hindered amines.

Also provided herein is a method of manufacturing an article. The method may extruding the herein described composition, comprising an isosorbide polymer and one or more hindered amines, and molding the extruded composition into an article.

Also provided herein is a composition comprising between 90 and 95 wt % isosorbide polycarbonate; between 4 and 8 weight % SEBS impact modifier; optionally between 0.1 and 0.6 wt % of an antioxidant; optionally between 2 wt % and 6 wt % of titanium dioxide; optionally between 0.1 and 0.5 wt % of plasticizers, lubricants and/or mold release agents and/or other additives; and between 0.1 and 0.5 of HALS 770. The composition may further comprise between 0.15 and 0.30 wt % of HALS 770. The composition may further comprise between 0.01 and 0.05 wt % of NaOH wherein the NaOH is 33 wt % in water. Also provided herein are articles comprising the foregoing described compositions.

DETAILED DESCRIPTION

Described herein is an isosorbide-based polymer composition that contains hindered amines (HALS). This composition may be in the form of a resin, which can be manufactured into an article that is resistant to discoloration and degradation induced by ultraviolet light (UV). The inventors have discovered that specific HALS can impart UV protection to isosorbide-based polymers as well as articles derived from resins containing combinations of these specific HALS and polymers.

1. Definitions.

The terminology used herein is for the purpose of describing particular embodiments only and is not intended to be limiting. As used in the specification and the appended claims, the singular forms "a," "an" and "the" include plural referents unless the context clearly dictates otherwise.

"Alkyl" as used herein may be linear, branched, or cyclic such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Alkenyl" as used herein may be a straight or branched hydrocarbyl chain containing one or more double bonds. Each carbon-carbon double bond may have either cis or trans geometry within the alkenyl moiety, relative to groups substituted on the double bond carbons. Non-limiting examples of alkenyl groups include ethenyl(vinyl), 2-propenyl, 3-propenyl, 1,4-pentadienyl, 1,4-butadienyl, 1-butenyl, 2-butenyl, and 3-butenyl.

"Alkenylene" as used herein may be a divalent unsaturated hydrocarbyl chain which may be linear or branched and which has at least one carbon-carbon double bond. Non-limiting examples of alkenylene groups include —C(H)=C(H)—, —C(H)=C(H)—CH$_2$—, —C(H)=C(H)—CH$_2$—CH$_2$—, —CH$_2$—C(H)=C(H)—CH$_2$—, —C(H)=C(H)—CH(CH$_3$)—, and —CH$_2$—C(H)=C(H)—CH(CH$_2$CH$_3$)—.

"Alkynyl" as used herein may be a straight or branched hydrocarbyl chain containing one or more triple bonds. Non-limiting examples of alkynyl include ethynyl, 1-propynyl, 2-propynyl, 3-propynyl, decynyl, 1-butynyl, 2-butynyl, and 3-butynyl.

"Alkynylene" as used herein may be a divalent unsaturated hydrocarbon group which may be linear or branched and which has at least one carbon-carbon triple bonds. Representative alkynylene groups include, by way of example, —C≡C—, —C≡C—CH$_2$—, —C≡C—CH$_2$—CH$_2$—, —CH$_2$—C≡C—CH$_2$—, —C≡C—CH(CH$_3$)—, and —CH$_2$—C≡C—CH(CH$_2$CH$_3$)—.

"C3-C6 cycloalkyl" as used herein may mean cyclopropyl, cyclobutyl, cyclopentyl and cyclohexyl.

"Carbocycle" or "carbocyclic" or "carbocyclyl" as used herein may be a saturated (e.g., "cycloalkyl"), partially saturated (e.g., "cycloalkenyl" or "cycloalkynyl") or completely unsaturated (e.g., "aryl") ring system containing zero heteroatom ring atom. "Ring atoms" or "ring members" are the atoms bound together to form the ring or rings. A carbocyclyl may be, without limitation, a single ring, two fused rings, or bridged or spiro rings. A substituted carbocyclyl may have either cis or trans geometry. Representative examples of carbocyclyl groups include, but are not limited to, cyclopropyl, cyclobutyl, cyclopentyl, cyclohexyl, cycloheptyl, cyclooctyl, cyclopentenyl, cyclopentadienyl, cyclohexadienyl, adamantyl, decahydro-naphthalenyl, octahydro-indenyl, cyclohexenyl, phenyl, naphthyl, indanyl, 1,2,3,4-tetrahydro-naphthyl, indenyl, isoindenyl, decalinyl, and norpinanyl. A carbocycle group can be attached to the parent molecular moiety through any substitutable carbon ring atom.

"Carbocyclylalkyl" as used herein may be a carbocyclyl group appended to the parent molecular moiety through an alkylene group. For instance, $C_3$-$C_6$carbocyclyl$C_1$-$C_6$alkyl refers to a $C_3$-$C_6$carbocyclyl group appended to the parent molecular moiety through $C_1$-$C_6$alkylene.

"Cycloalkenyl" as used herein may be a non-aromatic, partially unsaturated carbocyclyl moiety having zero heteroatom ring member. Representative examples of cycloalkenyl groups include, but are not limited to, cyclobutenyl, cyclopentenyl, cyclohexenyl, and octahydronaphthalenyl.

"Cycloalkyl" as used herein may be a saturated carbocyclyl group containing zero heteroatom ring member. Non-limiting examples of cycloalkyls include cyclopropyl, cyclobutyl, cyclopentyl, cyclohexyl, cycloheptyl, cyclooctyl, decalinyl and norpinanyl.

"Halo" as used herein may be a substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Heteroaryl" as used herein may mean any aromatic heterocyclic ring which may comprise an optionally benzocondensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazolyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Heterocycle" or "heterocyclo" or "heterocyclyl" as used herein may be partially unsaturated (e.g., "heterocycloalkenyl" or "heterocycloalkynyl") or completely unsaturated (e.g., "heteroaryl") ring system where at least one of the ring atoms is a heteroatom (i.e., nitrogen, oxygen or sulfur), with the remaining ring atoms being independently selected from the group consisting of carbon, nitrogen, oxygen and sulfur. A heterocycle may be, without limitation, a single ring, two fused rings, or bridged or spiro rings. A heterocycle group can be linked to the parent molecular moiety via any substitutable carbon or nitrogen atom(s) in the group.

A heterocyclyl may be, without limitation, a monocycle which contains a single ring. Non-limiting examples of monocycles include furanyl, dihydrofuranyl, tetrahydrofuranyl, pyrrolyl, isopyrroyl, pyrrolinyl, pyrrolidinyl, imidazolyl, isoimidazolyl, imidazolinyl, imidazolidinyl, pyrazolyl, pyrazolinyl, pyrazolidinyl, triazolyl, tetrazolyl, dithiolyl, oxathiolyl, oxazolyl, isoxazolyl, thiazolyl, isothiazolyl, thiazolinyl, isothiazolinyl, thiazolidinyl, isothiazolidinyl, thiadiazolyl, oxathiazolyl, oxadiazolyl (including 1,2,3-oxadiazolyl, 1,2,4-oxadiazolyl (also known as "azoximyl"), 1,2,5-oxadiazolyl (also known as "furazanyl"), and 1,3,4-oxadiazolyl), oxatriazolyl (including 1,2,3,4-oxatriazolyl and 1,2,3,5-oxatriazolyl), dioxazolyl (including 1,2,3-dioxazolyl, 1,2,4-dioxazolyl, 1,3,2-dioxazolyl, and 1,3,4-dioxazolyl), oxathiolanyl, pyranyl (including 1,2-pyranyl and 1,4-pyranyl), dihydropyranyl, pyridinyl, piperidinyl, diazinyl (including pyridazinyl (also known as "1,2-diazinyl"), pyrimidinyl (also known as "1,3-diazinyl"), and pyrazinyl (also known as "1,4-diazinyl")), piperazinyl, triazinyl (including s-triazinyl (also known as "1,3,5-triazinyl"), as-triazinyl (also known 1,2,4-triazinyl), and v-triazinyl (also known as "1,2,3-triazinyl), oxazinyl (including 1,2,3-oxazinyl, 1,3,2-oxazinyl, 1,3,6-oxazinyl (also known as "pentoxazolyl"), 1,2,6-oxazinyl, and 1,4-oxazinyl), isoxazinyl (including o-isoxazinyl and p-isoxazinyl), oxazolidinyl, isoxazolidinyl, oxathiazinyl (including 1,2,5-oxathiazinyl or 1,2,6-oxathiazinyl), oxadiazinyl (including 1,4,2-oxadiazinyl and 1,3,5,2-oxadiazinyl), morpholinyl, azepinyl, oxepinyl, thiepinyl, and diazepinyl.

A heterocyclyl may also be, without limitation, a bicycle containing two fused rings, such as, for example, naphthyridinyl (including [1,8]naphthyridinyl, and [1,6]naphthyridinyl), thiazolpyrimidinyl, thienopyrimidinyl, pyrimidopyrimidinyl, pyridopyrimidinyl, pyrazolopyrimidinyl, indolizinyl, pyrindinyl, pyranopyrrolyl, 4H-quinolizinyl, purinyl, pyridopyridinyl (including pyrido[3,4-b]-pyridinyl, pyrido[3,2-b]-pyridinyl, and pyrido[4,3-b]-pyridinyl), pyridopyrimidine, and pteridinyl. Other non-limiting examples of fused-ring heterocycles include benzo-fused heterocyclyls, such as indolyl, isoindolyl, indoleninyl (also known as "pseudoindolyl"), isoindazolyl (also known as "benzpyrazolyl"), benzazinyl (including quinolinyl (also known as "1-benzazinyl") and isoquinolinyl (also known as "2-benzazinyl")), benzimidazolyl, phthalazinyl, quinoxalinyl, benzodiazinyl (including cinnolinyl (also known as "1,2-benzodiazinyl") and quinazolinyl (also known as "1,3-benzodiazinyl")), benzopyranyl (including "chromenyl" and "isochromenyl"), benzothiopyranyl (also known as "thiochromenyl"), benzoxazolyl, indoxazinyl (also known as "benzisoxazolyl"), anthranilyl, benzodioxolyl, benzodioxanyl, benzoxadiazolyl, benzofuranyl (also known as "coumaronyl"), isobenzofuranyl, benzothienyl (also known as "benzothiophenyl", "thionaphthenyl", and "benzothiofuranyl"), isobenzothienyl (also known as "isobenzothiophenyl", "isothionaphthenyl", and "isobenzothiofuranyl"), benzothiazolyl, benzothiadiazolyl, benzimidazolyl, benzotriazolyl, benzoxazinyl (including 1,3,2-benzoxazinyl, 1,4,2-benzoxazinyl, 2,3,1-benzoxazinyl, and 3,1,4-benzoxazinyl), benzisoxazinyl (including 1,2-benzisoxazinyl and 1,4-benzisoxazinyl), and tetrahydroisoquinolinyl.

A heterocyclyl may comprise one or more sulfur atoms as ring members; and in some cases, the sulfur atom(s) is oxidized to SO or $SO_2$. The nitrogen heteroatom(s) in a heterocyclyl may or may not be quaternized, and may or may not be oxidized to N-oxide. In addition, the nitrogen heteroatom(s) may or may not be N-protected.

The number of carbon atoms in a hydrocarbyl moiety can be indicated by the prefix "$C_x$-$C_y$," where x is the minimum and y is the maximum number of carbon atoms in the moiety. Thus, for example, "$C_1$-$C_6$alkyl" refers to an alkyl substituent containing from 1 to 6 carbon atoms. Illustrating further, $C_3$-$C_6$carbocycle means a carbocycle containing from 3 to 6 carbon ring atoms. A prefix attached to a multiple-component substituent only applies to the first component that immediately follows the prefix. To illustrate, the term "carbocyclylalkyl" contains two components: carbocyclyl and alkyl. Thus, for example, $C_3$-$C_6$carbocyclyl $C_1$-$C_6$ alkyl refers to a $C_3$-$C_6$carbocyclyl appended to the parent molecular moiety through a $C_1$-$C_6$ alkyl group.

"Polycarbonate" as used herein may mean an oligomer or polymer comprising residues of one or more polymer structural units, or monomers, joined by carbonate linkages.

"Straight or branched C1-C3 alkyl" or "straight or branched C1-C3 alkoxy" as used herein may mean methyl, ethyl, n-propyl, isopropyl, methoxy, ethoxy, n-propoxy and isopropoxy. Unless otherwise indicated, each of the foregoing groups may be unsubstituted or substituted, provided that the substitution does not significantly adversely affect synthesis, stability, or use of the compound.

"Substituted" as used herein may mean that any at least one hydrogen on the designated atom or group is replaced with another group provided that the designated atom's normal valence is not exceeded. For example, when the substituent is oxo (i.e., =O), then two hydrogens on the atom are replaced. Combinations of substituents and/or variables are permissible provided that the substitutions do not significantly adversely affect synthesis or use of the compound.

The terms "structural unit" and "monomer" are interchangeable as used herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. UV-Stable Isosorbide Polymer Compositions

The present invention is directed to a photoresistant composition comprising a combination of one or more isosorbide-containing polymers and one or more specific HALS. The polymer may be a polycarbonate. The HALS protects the isosorbide-based polymer against UV-induced discoloration and degradation. The composition may further comprise other additives such as one or more impact modifiers and/or UV stabilizers.

a. Components of Isosorbide-Containing Polymers

The isosorbide-containing polymer may contain at least one isosorbide-containing monomer. The isosorbide-containing monomer may be formed from polymerizing an isosorbide bisphenol and an isosorbide-bisphenol reacting compound, wherein monomers are formed and polymerized to produce isosorbide containing polymers ("Polymer 1"). The isosorbide-containing polymer may be a homopolymer or a copolymer. To form a copolymer, other monomers, which may be non-isosorbide containing monomers, for example, may be reacted with the at least one isosorbide-bisphenol and an isosorbide-bisphenol-reacting compound under polymerization conditions. The polymerization conditions are dictated by the type of polymerization method, such as interfacial polymerization or melt polymerization, which are more fully described in U.S. patent application Ser. No. 12/965, 574, filed on Dec. 10, 2010, which is herein fully incorporated by reference.

The isosorbide-containing polymer may be a polycarbonate polymer. The polycarbonate polymer may comprise an isosorbide unit, an aliphatic unit derived from a C14-44 aliphatic diacid, C14-44 aliphatic diol, or combination thereof; and optionally, an additional unit different from the isosorbide and aliphatic units ("Polymer 2"). The isosorbide unit, aliphatic unit, and additional unit may be each contain a carbonate, or a combination of carbonate and ester units. The polycarbonate polymer may be a homopolymer or a copolymer.

(1) Components of Polymer 1
(a) Isosorbide-Bisphenol
Isosorbide-bisphenol may be represented by formula (I):

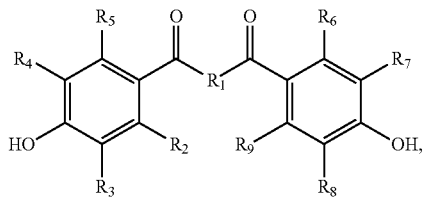

wherein R1 is an isosorbide and R2-R9 may be independently selected from the group consisting of a hydrogen, a halogen, a C1-C6 alkyl, a methoxy, an ethoxy, an alkyl ester and an arylalkyl. The bisphenol may have a pKa of between 8 and 11.

(b) Isosorbide-Bisphenol Reacting Compound

The isosorbide-bisphenol reacting compound may react with the isosorbide-bisphenol of formula (I). The isosorbide-bisphenol reacting compound may be one or more of phosgene, a triphosgene, diacyl halide, dihaloformate, dicyanate, diester, diepoxy, diarylcarbonate, dianhydride, dicarboxylic acid, and/or diacid chloride. The isosorbide-bisphenol reacting compound and the isosorbide-bisphenol may react under polymerization conditions to form a polymer structural unit, which can be polymerized.

(c) Isosorbide Unit

The isosorbide unit may be derived from an isosorbide. For the isosorbide unit may be a derivative of one or more of 1,4:3,6-dianhydro-D-sorbitol; 2,6-dioxabicyclo[3.3.0]octan-4,8-diol; 1,4:3,6-dianhydro-D-glucitol; 2,3,3a,5,6a-hexahydrofuro[3,2-b]furan-3,6-diol, and/or an isomer thereof.

The isosorbide unit may be derived from an isosorbide, a mixture of isosorbide, a mixture of isomers of isosorbide, and/or from individual isomers of isosorbide. The stereochemistry for the isosorbide-based carbonate units of formula III is not particularly limited. Specifically, isosorbide has the general formula III:

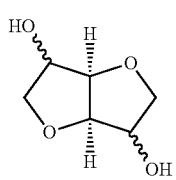

(III)

and can be a single diol isomer or mixture of diol isomers.
The stereochemistry for the isosorbide of formula III is also not particularly limited. These diols may be prepared by the dehydration of the corresponding hexitols. Hexitols are produced commercially from the corresponding sugars (aldohexose). Aliphatic diols of formula III include 1,4:3,6-dianhydro-D glucitol, of formula IV; 1,4:3,6-dianhydro-D mannitol, of formula V; and 1,4:3,6-dianhydro-L iditol, of formula VI, and any combination thereof. Isosorbides are available commercially from various chemical suppliers including Archer Daniels Midland Company, Cargill, Roquette, and Shanxi.

(IV)

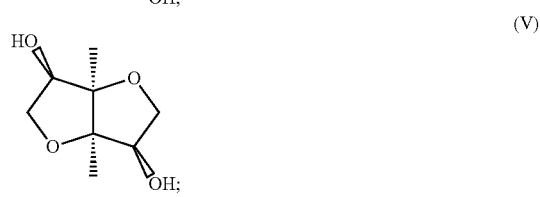

(V)

(VI)

The diol of formula IV may be desirable because it is rigid, chemically and thermally stable aliphatic diol that may be used to produce higher Tg copolymers than the other diols of formulas V and VI.

The isosorbide may have moisture content of less than 5%.
The isosorbide may have a pKa value of greater than 12.
The isosorbide may be made from a biomass derived starch through hydrolysis, hydrogenation, and dehydration reactions. For example,

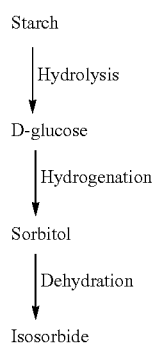

Starch
↓ Hydrolysis
D-glucose
↓ Hydrogenation
Sorbitol
↓ Dehydration
Isosorbide

Isosorbide provided by many commercial suppliers may contain sorbitol, which may be present due to the incomplete conversion to isosorbide. Sorbitol may react to form sorbitol-derived color bodies at elevated temperatures and extended reaction times of various reaction mixtures. The isosorbide may be tested for the presence of sorbitol and treated to reduce the concentration of sorbitol prior to polymerization. The isosorbide may be treated to reduce the concentration of sorbitol regardless of whether it is present or not. The sorbitol content in isosorbide may be measured by an organic purity measurement method such as chromatography. Such chromatographic methods include gas chromatography, and high performance liquid chromatography.

(d) Bisphenol Polymer Unit

The bisphenol polymer structural unit may have the following formula (VII):

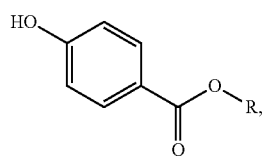

(VII)

wherein R is selected from the group consisting of a hydrogen, a C1-C6 alkyl, and an aromatic compound. The aromatic compound may be a substituted aromatic, such as a phenol. The phenol may be substituted. The aromatic compound may be substituted with a hydroxyl, alkoxy, alkoxycarbonyl, arylalkyl, halogen, sulfide, sulfate, nitrate, amino, nitrile, and/or nitro group. The aromatic compound may contain alkyl substituents of one or more carbon atoms per alkyl substituent. The aromatic compounds may be mono-nuclear or poly-nuclear and may contain one or more alkyl substituents. For example, the second reactant may be a mono-, di-, tri-, or tetra-alkyl substituted aromatic hydrocarbon, such as a dimethylbenzene, trimethylbenzene, dimethylnaphthalene, trimethylnaphthalene, tetramethylnaphthalene, diethylbenzene, mono-methylbenzene, monoethylbenzene, monomethyl-naphthalene, diethylnaphthalene, methylphenanthrene, dimethyl anthracene, dimethylpyrene, tetraethyl phenanthrene, dimethylchrysene, tetraethyl pyrene, trimethyl anthracene, diethyl-dimethyl phenanthrene, methyl ethylbenzene, methyl ethyl naphthalene, and the like. The alkyl substituent may have 2 or more carbon atoms. The aromatic compound may be heterocyclic.

The second reactant may have a pKa value such that, when the second reactant reacts with the first reactant, a bisphenol is produced that has a pKa value of between 8 and 11. The second reactant may be methyl-4-hydroxybenzoate.

(e) Other Monomers

The one or more isosorbide-bisphenol structural monomer unit(s) described above, which may be identical or different, may be polymerized with one or more other non-isosorbide-containing monomer compounds ("other monomers") (e.g. a second, third, fourth, fifth, sixth, etc., monomer compound). The other monomer(s) or compounds may be optionally selected for incorporation into the product polymer. Therefore, the polymers or polycarbonates may be isosorbide-containing copolymers.

The isosorbide-bisphenol monomers and other monomers may be randomly incorporated into the polymer. For example, the copolymer may be arranged in an alternating sequence following a statistical distribution, which is independent of the mole ratio of the structural units present in the polymer chain. A random copolymer may have a structure, which can be indicated by the presence of several block sequences of isosorbide-containing monomers (I-I) and other monomers (O-O) and alternate sequences (I-O) or (O-I), that follow a statistical distribution. In a random x:(1−x) copolymer, wherein x is the mole percent of the other monomer(s) and 1−x is the mole percent of the isosorbide-containing monomer, one can calculate the distribution of each monomer using peak area values determined by 13C NMR, for example.

The copolymer may have alternating copolymers with regular alternating I and O units (-I-O-I-O-I-O-I-O-), I and O units arranged in a repeating sequence (e.g. a periodic copolymer having the formula: (I-O-I-O-O-I-I-I-I-O-O-O)n)). The copolymer may be a statistical copolymer in which the sequence of monomer residues follows a statistical rule. For example, if the probability of finding a given type monomer residue at a particular point in the chain is equal to the mole fraction of that monomer residue in the chain, then the polymer may be referred to as a truly random copolymer. The copolymer may be a block copolymer that comprises two or more homopolymer subunits linked by covalent bonds (-I-I-I-I-I-O-O-O-O-O-). The union of the homopolymer subunits may require an intermediate non-repeating subunit, known as a junction block. Block copolymers with two or three distinct blocks are called diblock copolymers and triblock copolymers, respectively.

The other monomer may be a dihydroxy compound. The dihydroxy compound may be represented by formula (II):

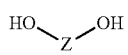

(II)

wherein Z may be an aromatic compound or an aliphatic compound.

The dihydroxy compound may be a 4,4'(3,3,5-trimethyl-cyclohexylidene)diphenol; a 4,4'-bis(3,5-dimethyl)diphenol, a 1,1-bis(4-hydroxy-3-methylphenyl)cyclohexane, a 1,1-bis(4'hydroxy-3'methylphenyl)cyclohexane (DMBPC), a 4,4'-1-methyl-4-(1-methyl-ethyl)-1,3-cyclohexandiyl]bisphenol (1,3 BHPM), a 4-[1-[3-(4-hydroxyphenyl)-4-methylcyclohexyl]-1-methyl-ethyl]-phenol (2,8 BHPM), a 3,8-dihydroxy-5a,10b-diphenyl-coumarano-2',3',2,3-coumarane (DCBP), a 2-phenyl-3,3-bis(4-hydroxyphenyl)heptane, a 2,4'-dihydroxydiphenylmethane, a bis(2-hydroxyphenyl)methane, a bis(4-hydroxyphenyl)methane, a bis(4-hydroxy-5-nitrophenyl)methane, a bis(4-hydroxy-2,6-dimethyl-3-methoxyphenyl)methane, a 1,1-bis(4-hydroxyphenyl)ethane, a 1,1-bis(4-hydroxy-2-chlorophenyl)ethane, a 2,2-bis(4-hydroxyphenyl)propane (BPA), a 2,2-bis(3-phenyl-4-hydroxyphenyl)propane, a 2,2-bis(4-hydroxy-3-methylphenyl)propane, a 2,2-bis(4-hydroxy-3-ethylphenyl)propane, a 2,2-bis(4-hydroxy-3-isopropylphenyl)propane, a 2,2-bis(4-hydroxy-3,5-dimethylphenyl)propane, a 2,2-bis(3,5,3',5'-tetrachloro-4,4'-dihydroxyphenyl)propane, a bis(4-hydroxyphenyl)cyclohexymethane, a 2,2-bis(4-hydroxyphenyl)-1-phenylpropane, a 2,4-dihydroxyphenyl sulfone, 4,4'-dihydroxydiphenylsulfone (BPS), bis(4-hydroxyphenyl)methane (bisphenol F, BPF), a 4,4'dihydroxy-1,1-biphenyl, 2,6-dihydroxy naphthalene, a hydroquinone, a resorcinol, a C1-3 alkyl-substituted resorcinol, a 3-(4-hydroxyphenyl)-1,1,3-trimethylindan-5-ol, a 1-(4-hydroxyphenyl)-1,3,3-trimethylindan-5-ol, or a 2,2,2',2'-tetrahydro-3,3,3',3'-tetramethyl-1,1'-spirobi[1H-indene]-6,6'-diol. The dihydroxy compound may be 1,3-propylene glycol, 1,2-propylene glycol, 2,2-dimethyl-1,3-propanediol, 2,2-dimethyl-1,3-propanediol, 2-ethyl-2-butyl-1,3-polypropanediol, 2-ethyl-2-isobutyl-1,3-propanediol, 1,3-terbutanediol, 1,4-butanediol, 1,5-pentanediol, 1,6-hexanediol, 2,2,4-tnmethyl-1,6-hexanediol, 1,3-cyclohexanedimethanol, 1,4-cyclohexanedimethanol, or a 2,2,4,4-tetramethyl-1,3-cyclobutanediol.

The isosorbide-bisphenol may be polymerized to form a homopolymer, the isosorbide-bisphenol may be polymerized with one or more other isosorbide-bisphenol structural units and/or it may be polymerized with one or more other non-isosorbide-containing monomers to form a copolymer. The homopolymers may be manufactured by selecting and reacting a single polymerizable isosorbide-containing monomer. Copolymers can be manufactured by selecting and reacting two or more different polymerizable monomers, wherein at least one monomer is an isosorbide-containing monomer, such as isosorbide bisphenol-containing structural unit. The isosorbide-containing polymer may be a polycarbonate, a polyurethane, a polyurea, a polyarylate, a polyester, a polyether, a polyetheramide, a polyformal, and a polyphenylene ether.

The polycarbonate may be

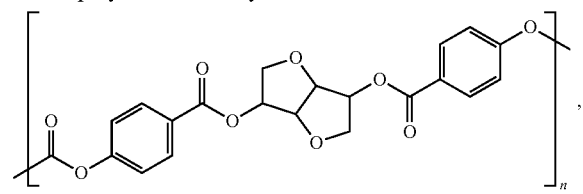

wherein n is greater than 1.

The polycarbonate may be

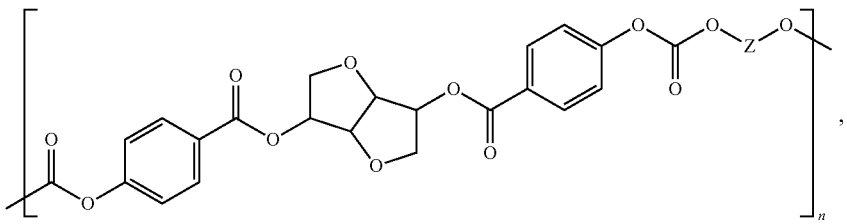

wherein z is an aromatic compound and n is greater than 1.

The polymer may have a weight average molecular weight (Mw) of about 3,000 to about 150,000, of about 10,000 to about 125,000, of about 50,000 to about 100,000, or of about 75,000 to about 90,000, and a glass transition temperature (Tg) of about 80° C. to about 300° C., of about 100° C. to about 275° C., of about 125° C. to about 250° C., of about 150° C. to about 225° C., or of about 175° C. to about 200° C. The polymer may have a high mechanical strength. The elastic modulus may be about 2.0 GPa to about 6 Gpa or about 3.0 GPa to about 5 Gpa, as determined by, for example, an instrumented indentation technique. The polymer may have a hardness of about 150 MPa to about 350 MPa, of about 200 MPa to about 325 MPa, of about 225 MPa to about 300 MPa, or of about 250 MPa to about 275 MPa. The polymer may have a Fries product concentration of less than about 500 ppm, less than about 400 ppm, less than about 300 ppm, less than about 200 ppm, or less than about 100 ppm. The Fries product concentration may be determined by high performance liquid chromatography (HPLC). The polymer may exhibit lower refractive index (RI), higher scratch resistance and/or lower oxygen permeability compared to conventional homo- or copolymers. The polymer may be optically active.

The herein described polymers may be blended with other polymers, such as thermoplastics and thermosets. The herein described polymers may be blended with polycarbonates including, but not limited to, conventional BPA polycarbonate and polycarbonates made using monomers such as resorcinol, 1,1-bis(4'-hydroxy-3'methyl phenyl)cyclohexane and 4,4'[1-methyl-4-(1-methylethyl)-1,3-cyclohexandiyl] bisphenol. The herein described polymers may be blended with an aliphatic polyester. The aliphatic polyester may be polycyclohexylidene cyclohexanedicarboxylate (PCCD).

(2) Components of Polymer 2

Polymer 2 may be an isosorbide based polycarbonate with an optional aliphatic-diol base. The polycarbonate may be a homopolycarbonate or a copolycarbonate having repeating structural carbonate units of:

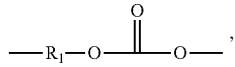

(A)

wherein the R1 groups are derived from a dihydroxy compound that can be aliphatic, aromatic, or a combination of these.

The polycarbonate described herein may have an isorbide weight percent of 100%.

The polycarbonate may be a combination of an isosorbide and diol; or isosorbide/diol/aliphatic base. The polycarbonate may comprise isosorbide units in a wt % amount of 50 to 100%, 60 to 100%, 70 to 100% of the total weight of the diol 5%, between 65 and 70%, between 70 and 75%, between 75 and 80%, between 80% and 85%, between 85% and 90%, or and diacid used to make the polycarbonate. The polycarbonate may comprise isosorbide units in a mol % between 60 and 6between 90 and 95% of the total weight of the diol and diacid used in the polycarbonate. The isosorbide wt % may be 70, 71, 72, 73, 74, 75, 76, 77, 78, 78, 79, 80, 81, 82, 83, 84, 85 or 86%. Examples of isosorbide-aliphatic-diol based polycarbonates also may include, but are not limited to, those described in U.S. Patent Pub. Appl. No. 2009/0105444, the contents of which are fully incorporated herein by reference.

The aliphatic-diol based polycarbonates in which R1 groups of carbonate units of formula (A) comprise aliphatic groups, and in particular fused cyclic alkyloxy groups, such as those based on fused furan ring structures found in aliphatic diols such as isosorbide. Specifically, the isosorbide-based polyester-polycarbonate comprising isosorbide-based carbonate units shown in formula (B):

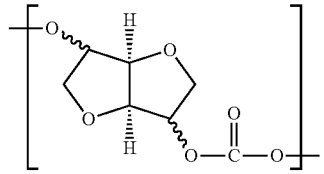

(B)

(a) Isosorbide

The isosorbide unit may be derived from an isosorbide, a mixture of isosorbide, a mixture of isomers of isosorbide, and/or from individual isomers of isosorbide. The stereochemistry for the isosorbide-based carbonate units of formula III is not particularly limited. Specifically, isosorbide has the general formula (C):

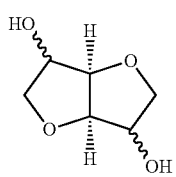
(C)

and can be a single diol isomer or mixture of diol isomers. The stereochemistry for the isosorbide of formula C is also not particularly limited. These diols may be prepared by the dehydration of the corresponding hexitols. Hexitols are produced commercially from the corresponding sugars (aldohexose). Aliphatic diols of formula 3 include 1,4:3,6-dianhydro-D glucitol, of formula D; 1,4:3,6-dianhydro-D mannitol, of formula E; and 1,4:3,6-dianhydro-L iditol, of formula F, and any combination thereof. Isosorbides are available commercially from various chemical suppliers including Archer Daniels Midland Company, Cargill, Roquette, and Shanxi.

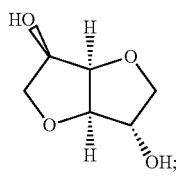
(D)

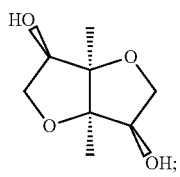
(E)

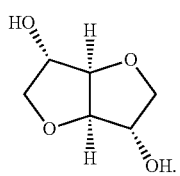
(F)

The diol of formula IV may be desirable because it is rigid, chemically and thermally stable aliphatic diol that may be used to produce higher Tg copolymers than the other diols of formulas E and F.

The polycarbonate, including the isosorbide-based polycarbonate as disclosed herein, can comprise a further carbonate unit derived from a dihydroxy compound, such as for example a bisphenol, that differs from the aliphatic diol of formula (C). In one embodiment, each further R1 group in formula (A) is a divalent aromatic group, for example derived from an aromatic dihydroxy compound of the formula (G):

$$HO-A_1-Y_1-A_2-OH \qquad (G)$$

wherein each of A1 and A2 is a monocyclic divalent arylene group, and Y1 is a single bond or a bridging group having one or two atoms that separate A1 from A2. In an exemplary embodiment, one atom separates A1 from A2. In another embodiment, when each of A1 and A2 is phenylene, Y1 is para to each of the hydroxyl groups on the phenylenes. Illustrative non-limiting examples of groups of this type are —O—, —S—, —S(O)—, —S(O)2-, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group Y1 can be a hydrocarbon group or a saturated hydrocarbon group such as methylene, cyclohexylidene, or isopropylidene.

Polymers of isosorbide contents of 50 weight percent (wt %) to 100 wt % isosorbide (i.e., with high biocontent) can be difficult to process because of the high Tg that accompanies homogeneous blocks of isosorbide carbonate units, where isosorbide homopolymer is expected to have a Tg in the range of 165 to 170° C. Therefore compositions with isosorbide are expected to possess a somewhat higher Tg compared to similar compositions based on BPA. Such runs of isosorbide carbonate units can require high processing temperatures of greater than or equal to 280° C., which can lead to degradation of the isosorbide carbonate units and thus the polycarbonate overall. In addition, isosorbide homopolymers, or isosorbide-based polycarbonates with high isosorbide carbonate unit content (translating to isosorbide block lengths of greater than about 20 isosorbide units) and prepared by interfacial polymerization methods can crystallize, making them more difficult to process than either isosorbide copolymers or non-isosorbide containing polycarbonates such as, for example, bisphenol A homopolycarbonate. Polymers with less than 50 wt % isosorbide are known, but by definition also have reduced biocontent.

The herein described polymer 2 may have an isosorbide mol % of between 60 and 65%, between 65 and 70%, between 70 and 75%, between 75 and 80%, between 80 and 85%, between 85 and 90%, or between 90 and 95%. Polymer 2 may have an isosorbide wt % of 80, 81, 82, 83, 84, 85, 86, 87, 88, 89, or 90%.

The herein described polymer 2 may have an amount of biocontent that is derived from the presence of a biologically-based unit. The biologically-based unit may be a biologically-derived monomer. The biologically based unit may be derived from a plant, for example. The plant may be any plant, such as a starch-based plant, sugar cane, corn, etc. The biologically-based unit may be isosorbide. At least 20 weight %, 25 weight %, 30 weight %, 35 weight %, 40 weight %, 45 weight %, 50 weight %, 55 weight %, 60 weight % or 65 weight % of the polymer, or composition derived therefrom, may be a biologically-based unit. The polymer, or any composition derived therefrom, may have at least 20 weight percent of isosorbide and/or a recyclable polymer.

(b) Bisphenol

Included within the scope of formula (G) are bisphenol compounds of general formula (H):

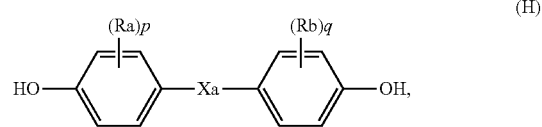
(H)

wherein Ra and Rb each represent a halogen atom or a monovalent hydrocarbon group and can be the same or different; p and q are each independently integers of 0 to 4; and Xa represents a single bond or one of the groups of formulas:

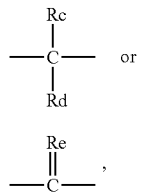

wherein Rc and Rd are each independently are each independently hydrogen, C1-12 alkyl, C1-12 cycloalkyl, C7-12 arylalkyl, C1-12 heteroalkyl, or cyclic C7-12 heteroarylalkyl, and Re is a divalent C1-12 hydrocarbon group. In particular, Rc and Rd are each the same hydrogen or C1-4 alkyl group, specifically the same C1-3 alkyl group, even more specifically, methyl.

In an embodiment, Rc and Rd taken together represent a C3-20 cyclic alkylene group or a heteroatom-containing C3-20 cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, C1-12 alkyl, C1-12 alkoxy, or C1-12 acyl.

In a specific exemplary embodiment, Xa is a substituted C3-18 cycloalkylidene of the formula (K):

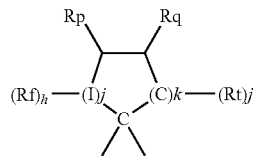

wherein each Rr, Rp, Rq, and Rt is independently hydrogen, halogen, oxygen, or C1-12 organic group; I is a direct bond, a carbon, or a divalent oxygen, sulfur, or —N(Z)— wherein Z is hydrogen, halogen, hydroxy, C1-12 alkyl, C1-12 alkoxy, or C1-12 acyl; h is 0 to 2, j is 1 or 2, i is an integer of 0 or 1, and k is an integer of 0 to 3, with the proviso that at least two of Rr, Rp, Rq, and Rt taken together are a fused cycloaliphatic, aromatic, or heteroaromatic ring. It will be understood that where the fused ring is aromatic, the ring as shown in formula (K) will have an unsaturated carbon-carbon linkage where the ring is fused. When k is 1 and i is 0, the ring as shown in formula (K) contains 4 carbon atoms, when k is 2, the ring as shown contains 5 carbon atoms, and when k is 3, the ring contains 6 carbon atoms. In one embodiment, two adjacent groups (e.g., Rq and Rt taken together) form an aromatic group, and in another embodiment, Rq and Rt taken together form one aromatic group and Rr and Rp taken together form a second aromatic group.

When k is 3 and i is 0, bisphenols containing substituted or unsubstituted cyclohexane units are used, for example bisphenols of formula (L):

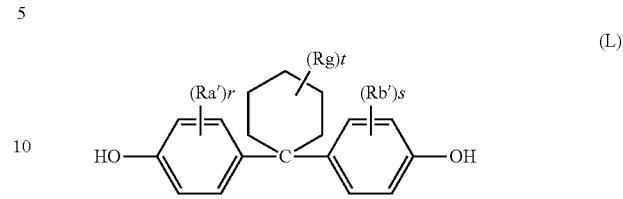

wherein substituents Ra' and Rb' can be aliphatic or aromatic, straight chain, cyclic, bicyclic, branched, saturated, or unsaturated, and Rg is C1-12 alkyl or halogen, r and s are independently integers from 0 to 4, and t is an integer of 0 to 10. It will be understood that hydrogen fills each valency when r is 0, s is 0, and t is 0. In one embodiment, each Ra' and Rb' is independently C1-12 alkyl. In a specific embodiment, where r and/or s is 1 or greater, at least one of each of Ra' and Rb' are disposed meta to the cyclohexylidene bridging group. The substituents Ra', Rb', and Rg may, when comprising an appropriate number of carbon atoms, be straight chain, cyclic, bicyclic, branched, saturated, or unsaturated. In a specific embodiment, Ra', Rb', and Rg are each $C_{1-4}$ alkyl, specifically methyl. In still another embodiment, Ra', Rb', and Rg is a C1-3 alkyl, specifically methyl, r and s are 0 or 1, and t is 0 to 5, specifically 0 to 3. Useful cyclohexane-containing bisphenols of formula (L) where t is 3, r and s are 0, and Rg is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the APEC® trade name.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3-methylphenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4- hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethyl-spiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (G) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one of the foregoing dihydroxy aromatic compounds can also be used.

Polymer 2 may have a bisphenol wt % of between 5 and 10%, between 10 and 15%, between 15 and 20%, between 20 and 25%, between 25 and 30%, between 30 and 35%, between 35 and 40%, between 40 and 45%, between 45 and 50%, or between 50 and 55%. Polymer 2 may have a bisphenol wt % of less than 95%, less than 90%, less than 85%, less than 80%, less than 75%, less than 70%, less than 60%, less than 55%, less than 50%, less than 45%, less than 40%, or less than 35%.

(c) Other Diols

Other types of diols can be present in the isosorbide-based polycarbonate. For example, a R1 can also be further derived from a dihydroxy aromatic compound of formula (M):

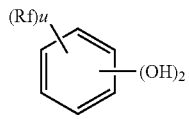

wherein each Rf is independently C1-12 alkyl, or halogen, and u is 0 to 4. It will be understood that Rf is hydrogen when u is 0. Typically, the halogen can be chlorine or bromine. In an embodiment, compounds of formula (M) in which the —OH groups are substituted meta to one another, and wherein Rf and u are as described above, are also generally referred to herein as resorcinols. Examples of compounds that can be represented by the formula (M) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimeric acid, and benzophenone tetracarboxylic acid. The branching agents can be added at a level of about 0.05 to about 2.0 wt %. Mixtures comprising linear polycarbonates and branched polycarbonates can be used.

Polycarbonates, including the isosorbide-based polyester-polycarbonate, also includes copolymers comprising carbonate units and other types of polymer units, including ester units, and combinations comprising at least one of homopolycarbonates and copolycarbonates. A specific type of polycarbonate copolymer of this type is a polyester carbonate, also known as a polyester-polycarbonate. Such copolymers further contain, in addition to recurring carbonate chain units of the formula (A), carbonate units derived from oligomeric ester-containing dihydroxy compounds (also referred to herein as hydroxy end-capped oligomeric acrylate esters) comprising repeating units of formula (N):

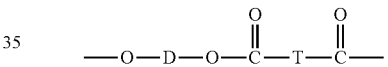

wherein D is a divalent group derived from a dihydroxy compound, and may be, for example, a C2-120 alkylene group, a C6-120 alicyclic group, a C6-120 aromatic group or a C2-200 polyoxyalkylene group in which the alkylene groups contain 2 to about 6 carbon atoms, specifically 2, 3, or 4 carbon atoms; and T is a divalent group derived from a dicarboxylic acid, and may be, for example, a C2-120 alkylene group, a C6-120 alicyclic group, a C6-120 alkyl aromatic group, or a C6-120 aromatic group.

Generally, polyester-polycarbonates can have the structure of formula (N) where in some embodiments D is a C2-120 alkylene group having a straight chain, branched chain, or cyclic (including polycyclic) structure. In other embodiments, D is derived from a dihydroxy aromatic compound of formula (G) above. In yet other embodiments, D is derived from a dihydroxy aromatic compound of formula (L) above. In a specific embodiment, as disclosed herein, D is a group derived from an aliphatic diol of formula (C). Where the aliphatic chain is long, for example greater than about 18 carbon atoms, it is necessary that it is branched to prevent crystallization. Thus, in a specific embodiment, D is a C14-20 alkylene group having a branched chain structure, such that the aliphatic alkylene chain will not crystallize in the polymer.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, D is a C2-6 alkylene group and T is p-phenylene, m-phenylene, naphthalene, a divalent cycloaliphatic group, or a combination thereof. This class of polyester includes the poly(alkylene terephthalates).

Where ester units are formed in the absence of other linking chemistry (e.g., carbonate precursors such as phosgene, or diaryl carbonates), the individual ester oligomerize to form a polyester unit, also referred to as a polyester block. The polyester unit can then be copolymerized in the presence of carbonate precursor and dihydroxy compounds to form the polyester-polycarbonate. The number of repeating ester units in a polyester unit of such a polyester-polycarbonate is typically greater than or equal to 4, specifically greater than or equal to 5, and more specifically greater than or equal to 8. Also in an embodiment, the number of ester units of formula (I) is less than or equal to 100, specifically less than or equal to 90, more specifically less than or equal to 70. It will be understood that the low and high endpoint values for the number of ester units of formula (I) present are independently combinable. In a specific embodiment, the number of ester units of formula (I) in a polyester-polycarbonate can be 4 to 50, specifically 5 to 30, more specifically 8 to 25, and still more specifically 10 to 20. Conversely, where ester units are formed in the presence of other linking chemistry such as carbonate precursors, a more random polyester-polycarbonate can form, with individual ester units or smaller blocks of repeating ester units of 2 or 3, interspersed with one or more of the other linking chemistry (e.g. carbonate units). Overall, in the polyester-polycarbonate, the molar ratio of ester units to carbonate units in the polyester-polycarbonate copolymers may vary broadly, for example 1:99 to 99:1, specifically 10:90 to 90:10, more specifically 25:75 to 75:25, depending on the desired properties of the final composition.

In an embodiment, the ester units of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the carbonate units of a polyester-polycarbonate can be derived from aliphatic diols of formula (C). Alternatively or in addition, in an exemplary embodiment, the carbonate units can be derived from resorcinol and/or bisphenol A. In another exemplary embodiment, the carbonate units of the polyester-polycarbonate can be derived from resorcinol and bisphenol A in a resulting molar ratio of resorcinol carbonate units to bisphenol A carbonate unit of 1:99 to 99:1.

As disclosed hereinabove, in a specific embodiment, the ester units are derived from an isosorbide of formula (C) to provide a polyester unit of formula (O):

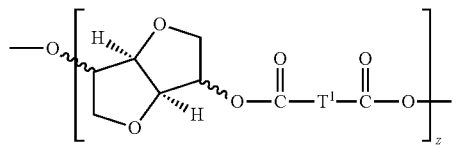

wherein T1 is a C2-118 alkylene group derived from the esterification reaction product of a C4-120 aliphatic diacid with the aliphatic diol of formula (C), and z is an integer of greater than or equal to 1.

(d) Aliphatic Diacid/Fatty Acid Dimer

As disclosed herein, the aliphatic-based polycarbonate further comprises, in addition to carbonate units of formula (B), aliphatic units that are either aliphatic carbonate units derived from aliphatic diols not identical to formula (C) (i.e., isosorbide) but having greater than 13 carbons, or a combination of aliphatic ester units derived from aliphatic diacids having greater than 13 carbons, in combination with isosorbide and aliphatic diols having greater than 13 carbons. Specifically, an isosorbide-based polycarbonate is an isosorbide-based copolycarbonate comprising, in addition to a carbonate unit of formula (B), an additional aliphatic carbonate unit derived from an aliphatic diol of greater than 13 carbons; or the isosorbide-based polycarbonate is an isosorbide-based polyester-polycarbonate comprising, in addition to a carbonate unit of formula (B), an ester unit of formula (O) in which T1 of the ester unit of an isosorbide-based polyester polycarbonate is derived from an aliphatic diacid of greater than 13 carbon atoms, and isosorbide and/or an aliphatic diol having greater than 13 carbons. Thus, in a specific embodiment, the isosorbide-based polycarbonate comprises aliphatic units derived from a C14-44 aliphatic diacid, C14-44 aliphatic diol, or combination of these.

The C14-44 aliphatic diacid or C14-44 aliphatic diol is each linear or branched, difunctional alkylene or alkenylene compounds that have the basic formula (P):

X-(L)-X wherein each X represents a carboxylic acid (—C(O)OH) or methylol (—CH2OH) functional group (where each comprises a single carbon atom). In an embodiment, each X in formula (10) is the same. Also in formula (P), L represents a linking group of greater than 11 carbon atoms. More specifically, L is a branched C12-42 alkylene or C12-42 alkenylene group. L may also include cyclic carbon substructures, specifically monocyclic, polycyclic, or fused polycyclic C3-12 cycloalkyl, C3-12 cycloalkenyl, C3-12 cycloalkylidenyl, C3-12 cycloalkylene, or C3-12 cycloalkenylene groups. In a specific embodiment, L is a C12-42 alkylene group comprising two alkyl branches. In a specific embodiment, the compound of formula (P) can be a branched, dimeric C36 or C44 fatty acid or alcohol. In another embodiment, the compound of formula (P) is a branched or linear C13-18 dimeric fatty acid or alcohol. A C36 or C44 dimeric fatty acid or alcohol must be branched to prevent crystallization of the alkylene or alkenylene chain.

The aliphatic diacid can be a branched chain dicarboxylic acid, and can if desired contain a cyclic group. Specifically, in an embodiment, the aliphatic diacid is a C14-44 aliphatic diacid or derivative thereof comprising the formula (Q):

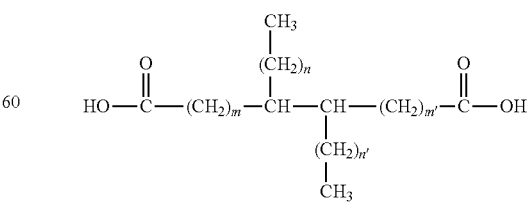

where m and m' are independently 0 to 38, n and n' are independently 0 to 38, and the sum m+m'+n+n' is an integer from 8 to 38. In a specific embodiment, a C36 aliphatic diacid has the structure of formula (Q), where m and m' are independently 0 to 30, n and n' are independently 0 to 30, and the sum m+m'+n+n' is 30. In another specific embodiment, a C36 aliphatic diacid has the structure of formula (Q), where each m and m' is independently 5 to 10, each n and n' is independently 5 to 10, and the sum m+m'+n+n' is 30. In an exemplary embodiment, m and m' are independently 7 or 8, n and n' are independently 7 or 8, and the sum m+m'+n+n' is 30. In a specific embodiment, a C44 aliphatic diacid has the structure of formula (Q), where m and m' are independently 0 to 30, n and n' are independently 0 to 30, and the sum m+m'+n+n' is 38. In an exemplary embodiment, m and m' are independently 12 or 13, n and n' are independently 6 or 7, and the sum m+m'+n+n' is 38. Such diacids are also referred to generally as dimeric fatty acids, and may be derived from the condensation of readily available biologically-derived feedstocks.

Polymer 2 may have a dimeric fatty acid mol % content of between 2 mol % and 8 mol %, between 5 mol % and 10 mol %, between 10 mol % and 15 mol %, between 15 mol % and 20 mol %, between 20 mol % and 25 mol %, between 25 mol % and 30 mol %, between 30 mol % and 35 mol %, between 35 mol % and 40 mol %, or between 40 mol % and 45 mol %. Polymer 2 may have a dimeric fatty acid content of 5 mol %, 6 mol %, 7 mol %, 8 mol %, 9 mol %, or 10 mol %. Polymer 2 may have a dimeric fatty acid content of less than 50 mol %, 40 mol %, 30 mol %, 20 mol %, 10 mol % or 5 mol %. Polymer 2 may have a dimeric fatty acid content of 0 mol %, 1 mol %, 2 mol %, 3 mol %, or 4 mol %.

In a specific embodiment, an isosorbide-based polyester-polycarbonate can comprise ester units having the formula (R):

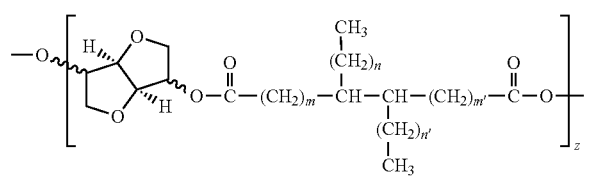

where m, m', n, and n' and the sum of these are as described for formula (Q), and z is an integer of greater than or equal to 1. In an exemplary embodiment, in formula (R), each m and m' is independently 7 or 8, each n and n' is independently 7 or 8, and the sum m+m'+n+n' is 30.

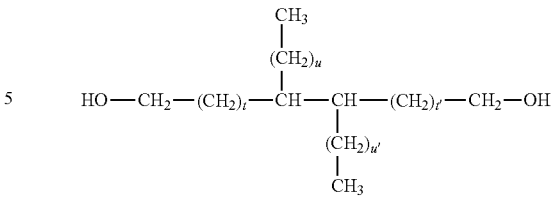

where t and t' are independently 0 to 38, u and u' are independently 0 to 38, and the sum t+t'+u+u' is an integer from 8 to 38. In a specific embodiment, a C36 aliphatic diol has the structure of formula (S), where t and t' are independently 0 to 30, u and u' are independently 0 to 30, and the sum t+t'+u+u' is 30. In another specific embodiment, a C36 aliphatic diol has the structure of formula (S), where each t and t' is independently 5 to 10, each u and u' is independently 5 to 10, and the sum t+t'+u+u' is 30. In an exemplary embodiment, a C36 aliphatic diol has the structure of formula (S), where t and t' are independently 7 or 8, u and u' are independently 7 or 8, and the sum t+t'+u+u' is 30. In another specific embodiment, a C44 aliphatic diol has the structure of formula (12), where t and t' are independently 0 to 30, u and u' are independently 0 to 30, and the sum t+t'+u+u' is 38. In an exemplary embodiment, a C44 aliphatic diol has the structure of formula (S) where t and t' are independently 12 or 13, u and u' are independently 6 or 7, and the sum t+t'+u+u' is 38.

In a specific embodiment, the isosorbide-based copolycarbonate comprises, in addition to a carbonate unit of formula (B), a carbonate unit of formula (T):

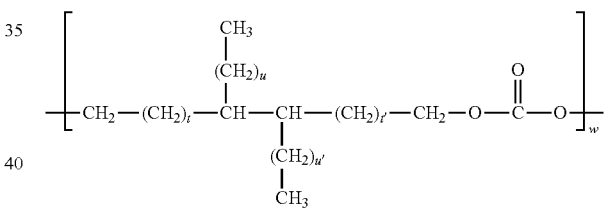

wherein t, t', u, and u', and the sum of these, is as defined for formula (S), and w is an integer of greater than or equal to 1.

In another specific embodiment, the isosorbide-based polyester-polycarbonate can include, in addition to carbonate units of both formulas (B) and (T) and ester units of formula (R), ester units of formula (U):

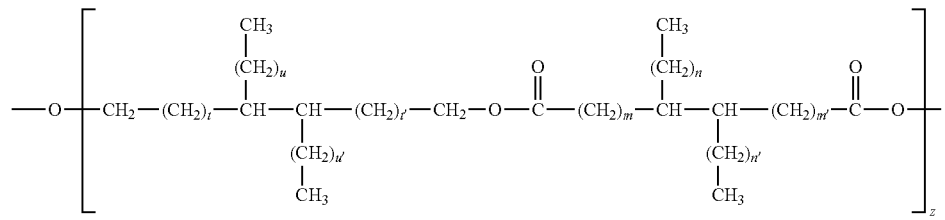

In another embodiment, the isosorbide-based polycarbonate is an isosorbide-based copolycarbonate comprising carbonate units derived from an aliphatic diol having greater than 13 carbon atoms. In an embodiment, the aliphatic diol is a C14-44 aliphatic diol of formula (S):

where m, m', n, and n' and the sum of these are as described for formula (U), t, t', u, and u' and the sum of these are as described for formula (S), and z is an integer of greater than or equal to 1. In an exemplary embodiment, in formula (U), each m, m', t, and t' is independently 7 or 8, each n, n', u, and u' is independently 7 or 8, and each of the sums m+m'+n+n' and t+t'+u+u' is 30.

In an embodiment, a useful aliphatic diacid or diol having greater than or equal to 13 carbons can be derived from the addition reaction of two unsaturated aliphatic acids. "Unsaturated", as used herein, can mean monounsaturated, diunsaturated, triunsaturated, polyunsaturated, or a combination of at least one of the foregoing. It will be understood that for unsaturated sites in the aliphatic diacid, the cis isomer, trans isomer, or a combination of cis and trans isomers can be present within reactant unsaturated aliphatic acid (such as where a single aliphatic diacid can have at least one each of a cis and trans isomerized double bond), or different isomers of unsaturated aliphatic acids may be combined (such as where a combination of a trans aliphatic acid and a cis aliphatic acid is used). Aliphatic acids that can be reacted to form the aliphatic diacid can include C3-37 unsaturated acids, specifically C4-30 unsaturated acids, more specifically C6-22 unsaturated acids, and still more specifically C12-22 unsaturated acids, provided the combined number of carbons in the reacted unsaturated acids is selected such that the resulting aliphatic diacid is a C14-44 diacid.

Exemplary unsaturated acids include unsaturated fatty acids derived from plant oils including sunflower oil, rapeseed oil, tall oil, castor bean oil, soybean oil, and the like. Specific unsaturated aliphatic acids include isomers of octenoic acids, nonenoic acid, decenoic acid, undecenoic acids, and dodecenoic acids; C14 unsaturated acids such as myristoleic acid (unsaturated at C9-C10); C16 unsaturated acids such as palmitoleic acid (unsaturated at C9-C10); C18 unsaturated acids such as oleic acid (unsaturated at C9-10), vaccenic acid (unsaturated at C11-C12), linoleic acid (unsaturated at C9-C10 and C12-C13), alpha-linoleic acid (unsaturated at C9-C10, C12-C13, C15-C16), and arachidinoic acid; C20 acids such as gadoleic acid (unsaturated at C9-C10) and eicosapentaenoic acid (with 4 unsaturation sites); C22 acids such as erucic acid (unsaturated at C14-C15) and docosahexaneoic acid (with 6 unsaturation sites). Combinations of the foregoing can be used. In a specific embodiment, a useful aliphatic diacid is a C36 aliphatic diacid that can be obtained from the reaction of two C18 unsaturated acids, such as oleic acid, linoleic acid, or a combination of these. In another specific embodiment, a useful aliphatic diacid is a C44 aliphatic diacid. In a further specific embodiment, a C44 aliphatic diacid can be prepared by dimerization of erucic acid.

Reaction of two unsaturated aliphatic acids can be accomplished by a carbon-carbon bond forming reaction between unsaturated sites in different unsaturated aliphatic acids, and can result in formation of a single bond, multiple single bonds (where an at least diunsaturated aliphatic monomer is used), cyclodimerization to form a bridging carbocycle, or other such carbon-carbon bonding between the unsaturated aliphatic acids. It will be understood that such reactions can produce a mixture of products and isomers, and that all such combinations of products and isomers are contemplated herewith. The reaction between unsaturated diacids may be accomplished by radical initiation, metal catalysis, photoinitiation, acid catalysis, or any suitable method. In an embodiment, the reaction of unsaturated aliphatic acids to form a C14-44 aliphatic diacid can be effected by use of a catalytic inorganic material including a clay having catalytic properties such as Montmorillonite. It is also possible that the aliphatic diacid can be derived from the condensation of two shorter chain unsaturated aliphatic acids such as, for example, acrylic acid, methacrylic acid, crotonic acid, or the like, with one or more unsaturated compounds that do not have acid groups. It is desirable that the C14-44 aliphatic diacid group is derived from plant based biological sources (such as e.g., vegetable oils), but may also be preparable from other commercially available feedstocks such as petroleum derivatives, coal extracts, animal sources, other plant sources such as timber, and the like, and so should not be considered as limited to vegetable or crop sources. Dimer fatty acids derived from natural sources are available commercially from chemical suppliers including Uniqema, Cognis, and Oleon.

(e) Polymer 2 Characteristics

The relative amount of each type of carbonate and/or ester unit present in the isosorbide-based polycarbonate will depend on the desired properties of the copolymer. In general, the isosorbide-based polycarbonate or polyester-polycarbonate will comprise 55 to 97.5 mol %, specifically 60 to 95 mol %, even more specifically 65 to 90 mol % of isosorbide units including carbonate units of formula (B) or ester units of formula (O). In an embodiment, the isosorbide carbonate or ester units are derived from the isosorbide of formula (C). In an embodiment, the isosorbide-based polycarbonate or polyester-polycarbonate will comprise 2.5 to 15 mol %, specifically 3 to 13 mol %, even more specifically 5 to 10 mol % of aliphatic units, where the aliphatic units are carbonate and/or ester units derived from aliphatic diols of formula (S) and/or aliphatic diacids of formula (Q). In an embodiment, the aliphatic units comprise carbonate units of formula (T), ester units of formula (R), ester units of formula (U), or a combination of these. The isosorbide-based polycarbonate can further comprise 0 to 42.5 mol %, specifically 2 to 40 mol %, even more specifically 5 to 30 mol % of additional units that can be carbonate and/or ester units and that are not identical to the isosorbide or aliphatic units in the isosorbide-based polycarbonate. In an embodiment, each of the additional carbonate units is derived from the dihydroxy aromatic compound of formula (C). In an exemplary embodiment, the additional carbonate unit is derived from bisphenol A. It will be thus understood that the isosorbide unit, aliphatic unit, and additional unit are carbonate, or a combination of carbonate and ester units, and the sum of the above mol % values of isosorbide units, aliphatic units, and additional units equals 100 mol %. In another embodiment, the isosorbide-based polycarbonate consists essentially of the isosorbide unit, the aliphatic unit, and the additional unit.

In an embodiment, the isosorbide-based polycarbonate consists essentially of carbonate units of formula (B) and carbonate units of formula (T). In another embodiment, the isosorbide-based polycarbonate further consists essentially of carbonate units of formula (A), where the carbonate units of formula (A) are not identical to the carbonate units of formulas (B) and (T). In another embodiment, the isosorbide-based polyester-polycarbonate consists essentially of carbonate units of formula (B) and ester units of formula (R). In another embodiment, the isosorbide-based polyester-polycarbonate further consists essentially of carbonate units of formula (A), where the carbonate units of formula (A) are not identical to the carbonate units of formula (B) and (T). In yet another embodiment, the isosorbide-based polyester-polycarbonate consists essentially of carbonate units of formula (B) and (T), and ester units of formulas (R) and (U). In another embodiment, the isosorbide-based polyester-polycarbonate further consists essentially of carbonate units of formula (A), where the carbonate units of formula (A) are not identical to the carbonate units of formulas (B) and (T). In a specific embodiment, isosorbide-based polycarbonate and/or the isosorbide-based polyester-polycarbonate each further consist essentially of carbonate units derived from dihydroxyaromatic compounds of formulas (D) and/or (L). In an exemplary embodiment, isosorbide-based polycarbonate and/or the isosorbide-based polyester-polycarbonate each further consist essentially of carbonate units derived from bisphenol A and/or resorcinol.

In an embodiment, the content of biologically derived material in the isosorbide-based polycarbonate (copolycarbonate or polyester-polycarbonate) is greater than or equal to 50 weight percent (wt %), specifically greater than or equal to 55 wt %, more specifically greater than or equal to 60 wt %, and still more specifically greater than or equal to 65 wt %, based on the total weight of the isosorbide-based polycarbonate. In a specific embodiment, the content of units derived from isosorbide of formula (C) is 65 to 95 wt %, specifically 70 to 90 wt %, more specifically 75 to 90 wt %, and still more specifically 78 to 86 wt %, based on the total amount of biologically derived material in the isosorbide-based polycarbonate. In another specific embodiment, the content of aliphatic units derived from aliphatic diacid of formula (Q) and/or aliphatic diol of formula (S) is 5 to 35 wt %, specifically 10 to 30 wt %, more specifically 15 to 25 wt %, and still more specifically 14 to 22 wt %, based on the total amount of biologically derived material in the isosorbide-based polycarbonate. In an embodiment, the biocontent of the isosorbide-based polycarbonate comprises units derived from isosorbide of formula (C), and units derived from aliphatic diacid of formula (Q) and/or units derived from aliphatic diol of formula (S). In a specific embodiment, the biocontent of the isosorbide-based polycarbonate consists essentially of units derived from isosorbide of formula (C), and units derived from aliphatic diacid of formula (Q) and/or units derived from aliphatic diol of formula (S).

In one embodiment the content of bio sourced monomers comprises greater than 60 mole % of all monomer in the isosorbide polycarbonate polymer. In another embodiment it comprises greater than 70 mole %. In yet another embodiment it comprises greater than 80 mole %. In yet another embodiment it comprises greater than 90 mole %.

Molecular weight for the polycarbonates, including the isosorbide-based polycarbonates disclosed herein, can be determined by gel permeation chromatography using universal calibration methods based on polystyrene (PS) standards. Generally polycarbonates can have a weight average molecular weight (Mw), of greater than about 5,000 g/mol based on PS standards. In an embodiment, the isosorbide-based polycarbonates can have an Mw of greater than or equal to about 39,000 g/mol, based on PS standards. In a specific embodiment, the isosorbide-based polycarbonate (including isosorbide-based polyester-polycarbonate) has an Mw based on PS standards of 39,000 to 100,000 g/mol, specifically 40,000 to 90,000 g/mol, more specifically 40,000 to 80,000 g/mol, and still more specifically 40,000 to 70,000 g/mol. In another embodiment, the isosorbide-based polycarbonate has an Mw based on polycarbonate (PC) standards of 20,000 to 70,000 g/mol, specifically 21,000 to 65,000 g/mol, more specifically 22,000 to 60,000 g/mol, and still more specifically 25,000 to 60,000 g/mol.

In an embodiment, the isosorbide-based polycarbonate has a number averaged molecular weight (Mn) based on PS standards of 15,000 to 65,000 g/mol, specifically 16,000 to 60,000 g/mol, more specifically 17,000 to 55,000 g/mol, and still more specifically 18,000 to 50,000 g/mol. The polydispersity (Mw/Mn) for the isosorbide-based polycarbonate is less than or equal to 3, specifically less than or equal to 2.5, more specifically less than or equal to 2.3. In a specific embodiment, the polydispersity is 2.0 to 2.3.

Molecular weight (Mw and Mn) as described herein, and polydispersity as calculated therefrom, is as determined using gel permeation chromatography (GPC), using a crosslinked styrene-divinylbenzene column, and either PS or PC standards as specified. GPC samples are prepared in a solvent such as methylene chloride or chloroform at a concentration of about 1 mg/ml, and are eluted at a flow rate of about 0.2 to 1.0 ml/min.

The glass transition temperature (Tg) of the isosorbide-based polycarbonates can be less than or equal to 135° C. In an embodiment, the glass transition temperature of the isosorbide-based polycarbonate is 85 to 130° C., specifically 90 to 130° C., more specifically 90 to 125° C., and still more specifically 90 to 120° C.

Polycarbonates, including the isosorbide-based polycarbonates disclosed herein, can have a melt volume ratio (MVR) of 0.5 to 80, more specifically 2 to 40 cm3/10 minutes, measured at 250° C. under a load of 5 kg according to ASTM D1238-04.

The isosorbide-based polycarbonates can further be manufactured to be substantially transparent. In this case, the isosorbide-based polycarbonate can have a transparency of greater than or equal to 55%, specifically greater than or equal to 60%, more specifically greater than or equal to 70%, still more specifically greater than or equal to 80%, and still more specifically greater than or equal to 90%, as measured using 3.2 mm plaques according to ASTM D1003-00. Alternatively, or in addition, the isosorbide-based polycarbonates can have a haze of less than or equal to 15%, specifically less than or equal to 10%, and still more specifically less than or equal to 5%, as measured using 3.2 mm thick plaques according to ASTM-D1003-00. In a specific embodiment, the isosorbide-based polycarbonate is an isosorbide-based polycarbonate homo- or copolymer with a haze of less than about 5%, and more specifically less than or equal to 4%, and still more specifically less than or equal to 3%, as measured using 3.2 mm thick plaques according to ASTM D1003-00.

In addition, the color capability and stability of the thermoplastic composition can be determined spectrophotometrically on extruded pellets, and classified according to the CIELAB color measurement method detailed by CIE (Commission Internationale de l'Eclairage). The values of E, L, a and b, used to describe the color space of a test material, are related by the equation (1):

$$\Delta E_{ab} = [(\Delta L)^2 + (\Delta a)^2 + (\Delta b)^2]^{0.5} \qquad (eq.\ 1)$$

In this equation, L represents the difference between light (L=100) and dark (L=0). The value a represents the difference between green (−a) and red (+a), and b represents the difference between yellow (+b) and blue (−b). The value of each parameter represents the magnitude of the difference in color. The net deviation for color capability is given by the overall deviation value E, which is the Euclidean distance between two points in a three dimensional space. Thus, the separation between points a and b, and the net deviation from the standard color, is given by the overall deviation value $\Delta E_{ab}$.

In an embodiment, the isosorbide-based polycarbonate has an initial color measured using extruded pellets such that L is greater than or equal to 70, specifically greater than or equal to 75, more specifically greater than or equal to 80, and still more specifically greater than or equal to 81, when measured after extrusion and/or molding. In another embodiment, the value of a is −0.5 to 10, specifically 0 to 8, when measured after extrusion and/or molding. In another embodiment, the value of b is 10 to 30, specifically 12 to 29, more specifically 14 to 28, and still more specifically 15 to 28 when measured after extrusion and/or molding.

Polycarbonates can also include, in some embodiments, polysiloxane-polycarbonates comprising carbonate units of formula (A) and polysiloxane blocks derived from a siloxane-containing dihydroxy compounds (also referred to herein as "hydroxyaryl end-capped polysiloxanes") that contains diorganosiloxane units blocks of formula (V):

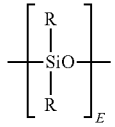
(V)

wherein each occurrence of R is same or different, and is a C1-13 monovalent organic group. For example, R can be a C1-C13 alkyl group, C1-C13 alkoxy group, C2-C13 alkenyl group, C2-C13 alkenyloxy group, C3-C6 cycloalkyl group, C3-C6 cycloalkoxy group, C6-C14 aryl group, C6-C10 aryloxy group, C7-C13 aralkyl group, C7-C13 aralkoxy group, C7-C13 alkylaryl group, or C7-C13 alkylaryloxy group. The foregoing groups can be fully or partially halogenated with fluorine, chlorine, bromine, or iodine, or a combination thereof. In an embodiment, where a transparent isosorbide-based polycarbonate is desired, R does not contain any halogen. Combinations of the foregoing R groups can be used in the same isosorbide-based polycarbonate.

The value of E in formula (V) can vary widely depending on the type and relative amount of each of the different units in the isosorbide-based polycarbonate, the desired properties of the isosorbide-based polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (W):

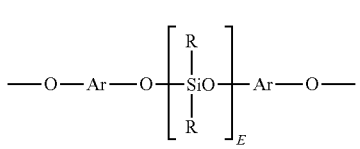
(W)

wherein E is as defined above; each R is the same or different, and is as defined above; and each Ar is the same or different, and is a substituted or unsubstituted C6-C30 arylene group, wherein the bonds are directly connected to an aromatic moiety. Ar groups in formula (W) can be derived from a C6-C30 dihydroxyaromatic compound, for example a dihydroxyaromatic compound of formula (H) or (M) described in detail below. Combinations comprising at least one of the foregoing dihydroxyaromatic compounds can also be used. Exemplary dihydroxyaromatic compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (X):

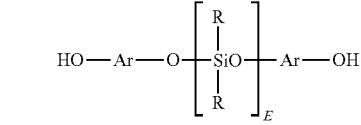
(X)

wherein Ar and E are as described above. Compounds of formula (T) can be obtained by the reaction of a dihydroxyaromatic compound with, for example, an alpha, omega-bis-acetoxy-polydiorganosiloxane oligomer under phase transfer conditions. Compounds of formula (T) can also be obtained from the condensation product of a dihydroxyaromatic compound, with, for example, an alpha, omega bis-chloro-polydimethylsiloxane oligomer in the presence of an acid scavenger.

In another embodiment, polydiorganosiloxane blocks comprises units of formula (Y):

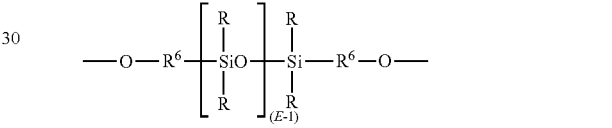

wherein R and E are as described above, and each R6 is independently a divalent C1-C30 organic group, and wherein the oligomerized polysiloxane unit is the reaction residue of its corresponding dihydroxy compound. The polysiloxane blocks corresponding to formula (Y) are derived from the corresponding dihydroxy compound of formula (Z):

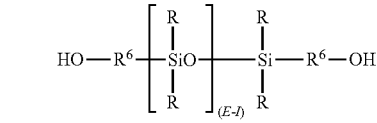
(Z)

wherein R and E and R6 are as described for formula (Y).

In a specific embodiment, the polydiorganosiloxane blocks are provided by repeating structural units of formula (AA):

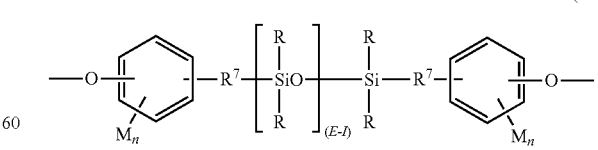
(AA)

wherein R and E are as defined above. R7 in formula (AA) is a divalent C2-C8 aliphatic group. Each M in formula (AA) can be the same or different, and is a halogen, cyano, nitro, C1-C8 alkylthio, C1-C8 alkyl, C1-C8 alkoxy, C2-C8 alkenyl, C2-C8 alkenyloxy group, C3-C8 cycloalkyl, C3-C8 cycloalkoxy, C6-C10 aryl, C6-C10 aryloxy, C7-C12 aralkyl, C7-C12 aralkoxy, C7-C12 alkylaryl, or C7-C12 alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; R7 is a dimethylene, trimethylene or tetramethylene group; and R is a C1-8 alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, R7 is a divalent C1-C3 aliphatic group, and R is methyl.

Polysiloxane-polycarbonates comprising units of formula (AA) can be derived from the corresponding dihydroxy polydiorganosiloxane (BB):

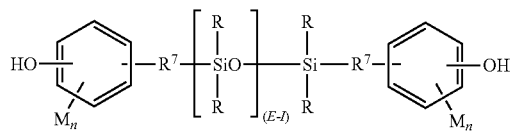
(BB)

wherein each of R, E, M, R7, and n are as described above. Such dihydroxy polysiloxanes can be made by effecting a platinum-catalyzed addition between a siloxane hydride of formula (CC):

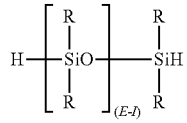
(CC)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can alai be used.

In an embodiment, the polysiloxane-polycarbonate can comprise polysiloxane blocks derived from the corresponding dihydroxy polysiloxane compound, present in an amount of 0.15 to 30 wt %, specifically 0.5 to 25 wt %, and more specifically 1 to 20 wt % based on the total weight of polysiloxane blocks and carbonate units. In a specific embodiment, the polysiloxane blocks are present in an amount of 1 to 10 wt %, specifically 2 to 9 wt %, and more specifically 3 to 8 wt %, based on the total weight of polysiloxane blocks and carbonate units.

Polysiloxane-polycarbonates further comprise carbonate units of formula (A) derived from a dihydroxy aromatic compound of formula (H). In an exemplary embodiment, the dihydroxy aromatic compound is bisphenol A. In an embodiment, the carbonate units comprising the polysiloxane-polycarbonate are present in an amount of 70 to 99.85 wt %, specifically 75 to 99.5, and more specifically 80 to 99 wt % based on the total weight of polysiloxane blocks and carbonate units. In a specific embodiment, the carbonate units are present in an amount of 90 to 99 wt %, specifically 91 to 98 wt %, and more specifically 92 to 97 wt %, based on the total weight of polysiloxane blocks and carbonate units.

(3) Method of Making Polymer 2

Polycarbonates can typically be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions, e.g., about 8 to about 10.

The isosorbide-based polycarbonate or polyester-polycarbonate may be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an embodiment, an activated carbonate such as bis(methyl salicyl)carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

The melt polymerization includes a transesterification catalyst comprising an first catalyst, also referred to herein as an alpha catalyst, comprising a metal cation and an anion. In an embodiment, the cation is an alkali or alkaline earth metal comprising Li, Na, K, Cs, Rb, Mg, Ca, Ba, Sr, or a combination comprising at least one of the foregoing. The anion is hydroxide (OH—), superoxide ($O_2$—), thiolate (HS—), sulfide (S2-), a C1-20 alkoxide, a C6-20 aryloxide, a C1-20 carboxylate, a phosphate including biphosphate, a C1-20 phosphonate, a sulfate including bisulfate, sulfites including bisulfites and metabisulfites, a C1-20 sulfonate, a carbonate including bicarbonate, or a combination comprising at least one of the foregoing. Salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, NaH2PO3, NaH2PO4, Na2H2PO3, KH2PO4, CsH2PO4, Cs2H2PO4, Na2SO3, Na2S2O5, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In an embodiment, the transesterification catalyst is an alpha catalyst consisting essentially of an alkali or alkaline earth salt. In an exemplary embodiment, the transesterification catalyst consists essentially of sodium hydroxide, potassium hydroxide, sodium carbonate, potassium carbonate, sodium methoxide, potassium methoxide, NaH2PO4, or a combination comprising at least one of the foregoing.

The amount of alpha catalyst can vary widely according to the conditions of the melt polymerization, and can be about 0.001 to about 500 μmol. In an embodiment, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In addition, a second transesterification catalyst, also referred to herein as a beta catalyst, may be included in the melt polymerization process, provided that the inclusion of such a second transesterification catalyst does not significantly adversely affect the desirable properties of the isosorbide-based polycarbonate. Exemplary transesterification catalysts may further include a combination of a phase transfer catalyst of formula (R3)$_4$Q+X above, wherein each R3 is the same or different, and is a C1-10 alkyl group; Q is a nitrogen or phosphorus atom; and X is a halogen atom or a C1-8 alkoxy group or C6-18 aryloxy group. Exemplary phase transfer catalyst salts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is C—, Br—, a C1-8 alkoxy group or a C6-18 aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In some embodiments, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other embodiments, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In a specific embodiment, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

The use of a melt process employing an activated carbonate is particularly preferred. As used herein, the term "activated carbonate", is defined as a diarylcarbonate that is more reactive than diphenylcarbonate in transesterification reactions. In an embodiment, the activated carbonate has a formula (DD):

wherein Ar is a substituted C6-30 aromatic group. In a specific embodiment, the activated carbonates have the formula (EE):

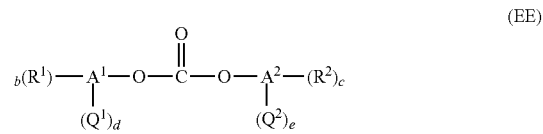

wherein Q1 and Q2 are each independently an activating group present on A1 and A2 respectively, positioned ortho to the carbonate linkage; A1 and A2 are each independently aromatic rings which can be the same or different; "d" and "e" have a value of 0 to a maximum equivalent to the number of replaceable hydrogen groups substituted on the aromatic rings A1 and A2 respectively, and the sum "d+e" is greater than or equal to 1; R1 and R2 are each independently a C1-30 aliphatic group, a C3-30 cycloaliphatic group, a C5,-30 aromatic group, cyano, nitro or halogen; "b" has a value of 0 to a maximum equivalent to the number of replaceable hydrogen atoms on the aromatic ring A1 minus "d"; and "c" is a whole number from 0 to a maximum equivalent to the number of replaceable hydrogen atoms on the aromatic ring A2 minus "e". The number, type and location of the R1 or R2 substituents on the aromatic ring is not limited unless they deactivate the carbonate and lead to a carbonate, which is less reactive than diphenylcarbonate.

Non-limiting examples of suitable activating groups Q1 and Q2 include (acyloxycarbonyl)aryl groups, halogens, nitro groups, amide groups, sulfone groups, sulfoxide groups, or imine groups with structures shown below:

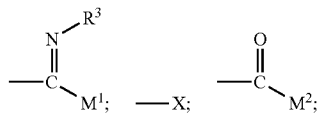

wherein X is halogen or nitro; M1 and M2 independently comprise N-dialkyl, N-alkylaryl, an aliphatic functionality or an aromatic functionality; and R3 is an aliphatic functionality or an aromatic functionality.

Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures where the type and number of substitutions on A1 and A2 are different can also be used as the carbonate precursor. In an embodiment, the activated carbonate is an ester-substituted diarylcarbonate having the formula (FF):

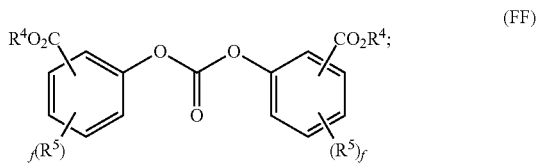

(FF)

wherein R4 is independently at each occurrence a C1-20 aliphatic group, a C4-20 cycloaliphatic group, or a C4-20 aromatic group, R5 is independently at each occurrence a halogen atom, cyano group, nitro group, a C1-20 aliphatic group, a C4-20 cycloaliphatic group, or a C4-20 aromatic group and f is independently at each occurrence an integer having a value of 0 to 4. In one embodiment, at least one of the substituents —CO2R4 is attached in an ortho position of formula (AA).

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one embodiment, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures may also be used as non-activated carbonates.

An end-capping agent (also referred to as a chain-stopper) can be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and C1-C22 alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Endgroups can derive from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the endgroup of a polycarbonate, including an isosorbide-based polycarbonate polymer as defined herein, can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In a specific embodiment, where BMSC is used as the activated carbonyl source, the endgroup is derived from and is a residue of BMSC, and is an ester endgroup derived from a salicylic acid ester, having the structure of formula (GG):

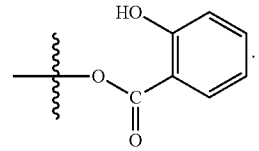 [SMILES: *OC(=O)c1ccccc1O]

In a more specific embodiment, the endgroup is an ester end group derived from an isosorbide salicylic acid ester (-IS-Sal-OH), having the structure of formula (HH):

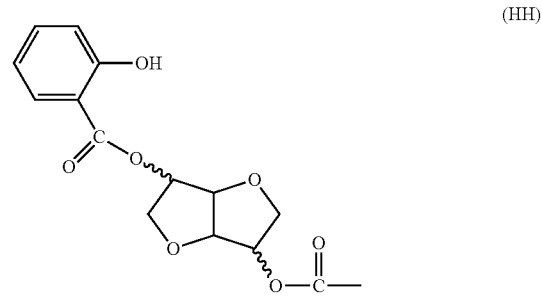 [SMILES: CC(=O)OC1COC2C(OC(=O)c3ccccc3O)COC12]

(HH)

in which the free hydroxy of a penultimate isosorbide unit (ester or carbonate) at the terminus of a growing isosorbide-based polycarbonate polymer forms a transesterification product (i.e., an ester endgroup) as shown in formula (HH). The amount of ester endgroup can vary according to the melt polymerization reaction conditions. In an embodiment, where a combination of alpha and beta catalysts are used in the melt polymerization, an isosorbide-based polycarbonate polymer prepared from an activated carbonate includes endgroups in an amount of less than 2,000 ppm, specifically less than 1,500 ppm, more specifically less than 1,000 ppm, based on the weight of the polycarbonate. In another embodiment, where only an alpha catalyst is used in the melt polymerization, an isosorbide-based polycarbonate polymer prepared from an activated carbonate includes endgroups in an amount of less than or equal to 500 ppm, specifically less than or equal to 400 ppm, more specifically less than or equal to 300 ppm, and still more specifically less than or equal to 200 ppm, based on the weight of the polycarbonate. In a specific embodiment, the endgroups are endgroups of formula (GG).

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., isosorbide, aromatic dihydroxy compound, and aliphatic diacid or diol). In a specific embodiment, the molar ratio of activated aromatic carbonate to monomer unit compounds is 1.013 to 1.29, specifically 1.015 to 1.028. In another specific embodiment, the activated aromatic carbonate is BMSC.

The melt polymerization reaction using an activated aromatic carbonate is conducted by subjecting the above reaction mixture to a series of temperature-pressure-time protocols. In some embodiments, this involves gradually raising the reaction temperature in stages while gradually lowering the pressure in stages. In an embodiment, the pressure is reduced from about atmospheric pressure at the start of the reaction to about 1 millibar (100 Pa) or lower, or in another embodiment to 0.1 millibar (10 Pa) or lower in several steps as the reaction approaches completion. The temperature may be varied in a stepwise fashion beginning at a temperature of about the melting temperature of the reaction mixture and subsequently increased to about 320° C. In one embodiment, the reaction mixture is heated from room temperature to about 150° C. The polymerization reaction starts at a temperature of about 150° C. to about 220° C., then is increased to about 220° C. to about 250° C. and is then further increased to a temperature of about 250° C. to about 320° C. and all subranges there between. The total reaction time is about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. Efficient removal of the by-product may be achieved by different techniques such as reducing the pressure. Generally the pressure starts relatively high in the beginning of the reaction and is lowered progressively throughout the reaction and temperature is raised throughout the reaction. Experimentation is needed to find the most efficient conditions for particular production equipment.

The progress of the reaction may be monitored by measuring the melt viscosity or the weight average molecular weight of the reaction mixture using techniques known in the art such as gel permeation chromatography. These properties may be measured by taking discreet samples or may be measured on-line. After the desired melt viscosity and/or molecular weight is reached, the final polycarbonate product may be isolated from the reactor in a solid or molten form. It will be appreciated by a person skilled in the art, that the method of making aliphatic homopolycarbonate and aliphatic-aromatic copolycarbonates as described in the preceding sections may be made in a batch or a continuous process and the process disclosed herein is essentially preferably carried out in a solvent free mode. Reactors chosen should ideally be self-cleaning and should minimize any "hot spots." However, vented extruders similar to those that are commercially available may be used. Further description of melt polymerization, as it may be used to make polymer 2, may be found in U.S. Pat. Nos. 7,138,479 and 7,718,755, the contents of which are fully incorporated by reference.

b. HALS

The photoresistant composition further comprises hindered amines. Hindered amines are used to make the ultraviolet radiation stable in isosorbide-containing polymer. The sterically hindered amine (HALS) are blended into the isosorbide-containing polymers described above and have the structure of Formula I:

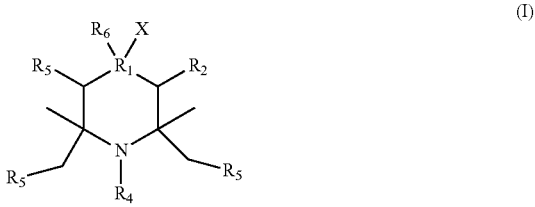

wherein $R^1$ is C, X is H, and $R^2$ is H; wherein R.sub.4 is selected from hydrogen, oxyl, hydroxyl, alkyl of 1 to 20 carbons, alkenyl or alkynyl of 3 to 8 carbons, aralkyl of 7 to 12 carbons, aliphatic acyl of 1 to 10 carbons, aromatic acyl of 7 to 13 carbons, alkoxycarbonyl of 2 to 9 carbons, aryloxycarbonyl of 7 to 15 carbons, alkyl, aryl, cycloalkyl or aralkyl substituted carbamoyl of 2 to 13 carbons, hydroxyalkyl of 1 to 5 carbons, 2-cyanoethyl, epoxyalkyl of 3 to 10 carbons, or a polyalkylene oxide group of 4 to 30 carbons; R.sub.5 is selected from hydrogen or alkyl of 1 to 4 carbons; R.sub.6 is selected from hydrogen, hydroxyl, alkoxy of 1 to 4 carbons,

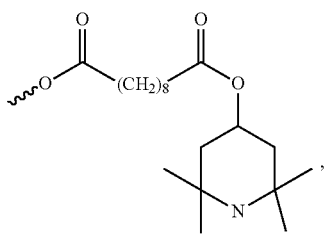

when $R_6$ is hydrogen, X is a divalent radical selected from
—Z—$R_7$—C(═O)—N($R_8$)—, —Z—C(═O)—N($R_8$)—, —Z—C(═O)—$R_9$—C(═O)—N($R_8$)—, —$R_7$—C(═O)—N($R_8$)—, or —C(═O)—N($R_8$)—, Z is —O—, —N(R$_{10}$)—, or —N(R$_{12}$)—R11-N(R$_{12}$)—; when R$_6$ is hydroxyl or alkoxy, X is a divalent radical selected from —R7-C(═O)—N(R8)- or —C(═O)—N(R8)-, R7 is an alkylene diradical of 1 to 4 carbons, R8 is selected from hydrogen, primary or secondary alkyl of 1 to 8 carbons, aralkyl of 7 to 12 carbons, or cycloalkyl of 5 to 12 carbons, R9 is selected from a direct bond or the following substituted or unsubstituted radicals of alkylene of 1 to 14 carbons, oxydialkylene of 4 to 10 carbons, thiodialkylene of 4 to 10 carbons, alkenylene of 2 to 10 carbons, o, m, or p-phenylene, wherein the substituents for R9 are selected from lower alkyl, lower alkoxy, hydroxy, bromine, chlorine, mercapto, or lower alkylmercapto; R10 and R.12 are selected from hydrogen, alkyl of 1 to 10 carbons, aryl of 6 to 12 carbons, aralkyl of 7 to 12 carbons, and cycloalkyl of 5 to 12 carbons, R10 may be a radical of 2-cyanoethyl radical or the formula R11 is alkylene of 2 to 12 carbons.

HALS bearing reactive hydrazide functionalities may be reacted with isosorbide-containing polymers including the following: 3-(2,2,6,6-tetramethyl-4-piperidinylamino)propionohydrazide, 3-(1,2,2,6,6-pentamethyl-4-piperidinylamino)propionhydrazide, (2,2,6,6-tetramethyl-4-piperidinylamino)acetylhydrazide, (1,2,2,6,6-pentamethyl-4-piperidinylamino)acetylhydrazide, N-(2,2,6,6-tetramethyl-4-piperidinyl)hydrazinecarboxamide, N-(1,2,2,6,6-pentamethyl-4-piperidinyl)hydrazinecarboxamide, N-(2,2,6,6-tetramethyl-4-piperidinyl)-N'-aminooxamide, N-(1,2,2,6,6-pentamethyl-4-piperidinyl)-N'-aminooxamide, N-(2,2,6,6-tetramethyl-4-piperidinyl)-N'-aminosuccinamide, N-(1,2,2,6,6-pentamethyl-4-piperidinyl)-N'-aminosuccinamide, N-(2,2,6,6-tetramethyl-4-piperidinyl)-N'-aminomalonamide, N-(1-benzyl-2,2,6,6-tetramethyl-4-piperidinyl)-N'-aminomalonamide, N-(1-benzyl-2,2,6,6-tetramethyl-4-piperidinyl)-N'-aminooxamide, N-(1-beta-hydroxyethyl-2,2,6,6-tetramethyl-4-piperidinyl)-N'-aminooxamide, N-(2,6-diethyl-2,3,6-trimethyl-4-piperidinyl)-N'-aminoadipamide, N-(1-acetyl-2,2,6,6-tetramethyl-4-piperidinyl)-N'-aminooxamide, 3-(1-acetyl-2,2,6,6-tetramethyl-4-piperidinylamino)propionhydrazide, (2,2,6,6-tetramethyl-4-piperidinyloxy)acetyl hydrazide, (1,2,2,6,6-pentamethyl-4-piperidinyloxy)acetylhydrazide, 3-(2,2,6,6-tetramethyl-4-piperidinyloxy)propionhydrazide, 3,(1,2,2,6,6-pentamethyl-4-piperidinyloxy)propionhydrazide, N-(1-acetyl-2,2,6,6-tetramethyl-4-piperidinyl)hydrazinecarboxamide, N-(1-benzoyl-2,2,6,6-tetramethyl-4-piperidinyl)-N'-aminooxamide, 3-(1-benzoyl-2,2,6,6-tetramethyl-4-piperidinylamino)propionhydrazide, N,N-bis-(2,2,6,6-tetramethyl-4-piperidinyl)-N'-aminooxamide, and 3-[N,N-bis-(2,2,6,6-tetramethyl-4-piperidinyl)amino]propionhydrazide.

The HALS may have the following structures as well:

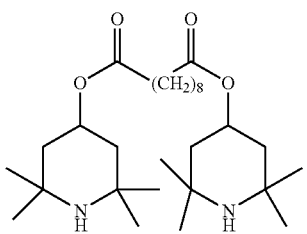

(also known as TINUVIN®770-MW of 480.7; mp of 82-86),

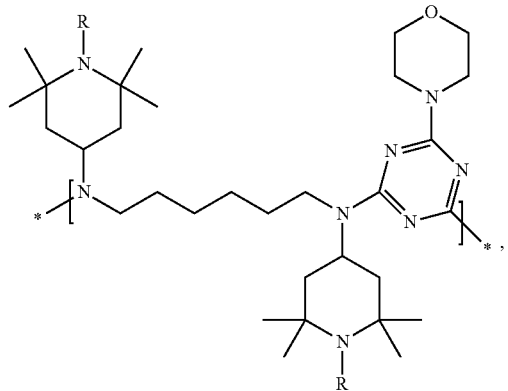

wherein R is either CH$_3$ (CYASORB® UV-3529 (Cytec)) or acyl (CYASORB® UV-3631 (Cytec)) (MW1700), or

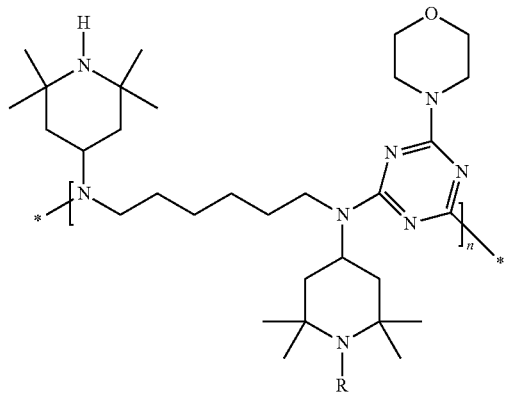

(also known as CYASORB® UV-3346 (Cytec) or CYASORB® UV-4593 (Cytec) as a mixture) (MW=1600; mp=110-130).

The HALS described above act as stabilizers because they are readily oxidized to the nitroxyl radical, which acts as a catalyst for the termination step of the free radical oxidation cycle (See Scheme 1). These HALS are also good catalysts and are consumed slowly so they greatly increase the stability of polycarbonate which have slow initiation steps and very long kinetic chains for the oxidation cycle.

The HALS may be added to the polymerization reaction and isosorbide-bisphenol polymer prior to extrusion. The polymerization reaction may include one or more structural HAL units in the presence of one or more isosorbide-bisphenol copolymers.

HALS may be present in the composition at a weight percent below 0.5%, below 0.4%, below 0.3%, below 0.2%, below 0.1%, below 0.007%, or below 0.005%. The HALS may be present in the composition at a weight percent below 0.3%. A single HALS compound may have a molecular weight below 3000 g/mol, below 2500 g/mol, below 2000 g/mol, below 1870 g/mol, below 1700 g/mol, below 1600 g/mol, below 1530 g/mol, below 1500 g/mol, below 1000, below 750 g/mol, below 500 g/mol, below 250 g/mol, or below 100 g/mol. The molecular weight, or molecular mass, may be calculated from the structure of the HALS compound.

(1) Method of Producing Hydrazido Functionalized Hindered Amines

Most of the hydrazido functionalized hindered amine light stabilizers used as starting materials for the preparation of the compositions of this invention are derivatives of 4-amino-2,2,6,6-tetraalkylpiperidines. The 4-amino-2,2,6,6-tetraalkylpiperidines are usually prepared by the reductive amination of 2,2,6,6-tetraalkylpiperidones with ammonia or primary amines [See U.S. Pat. No. 4,191,683 or W. B. Lutz, S. Lazarus and R. I. Meltzer, J. Org. Chem. 27, 1695 (1962)]. 4-Amino-2,2,6,6-tetramethylpiperidine, N-butyltriacetonediamine and bis-(2,2,6,6-tetramethyl-4-piperidyl)amine are available from Huls Chemische Werke in Germany.

Prior to the reductive amination, alkyl, alkenyl, alkynyl, aralkyl, hydroxyalkyl or 2-cyanoethyl groups may be introduced on the hindered nitrogen by standard alkylation techniques using alkyl, alkenyl, alkynyl or aralkyl halides, dialkyl sulfates, alkylene oxides or acrylonitrile. Alternatively, the 4-amino-2,2,6,6-tetraalkylpiperidine may be converted to the corresponding 4-benzoylamino-2,2,6,6-tetraalkylpiperidine, the hindered amine alkylated with one of the above alkylating agents and then the benzoyl group hydrolyzed with concentrated hydrochloric acid. These techniques are demonstrated in U.S. Pat. No. 4,223,147.

The 4-amino-2,2,6,6-tetraalkylpiperidines or their 1-substituted derivatives may be reacted with an excess of a diester to form a monoamide-monoester which can then be reacted with hydrazine, hydrazine hydrate or a mono-substituted alkylhydrazine to form a hydrazido substituted hindered amine light stabilizer. The intermediate monoamide-monoesters may also be prepared by the reaction of the 4-amino-2,2,6,6-tetraalkylpiperidine with mono acid chlorides-mono esters of dicarboxylic acids or mono esters of dicarboxylic acids followed by esterification of the carboxyl group. Some may also be prepared by reaction with a cyclic anhydride of a 1,2 or 1,3-dicarboxylic acid followed by esterification of the carboxyl group. The intermediate monoamide-monoesters may be alkylated on the hindered nitrogen if it is unsubstituted with the above alkylating agents or acylated with aliphatic or aromatic acid chlorides, chloroformates, carbamoyl chlorides, or isocyanates. The alkylation or acylation of the unsubstituted hindered nitrogen should be carried out prior to the conversion of the intermediate mono-amide-mono-ester to the hydrazide. These techniques are demonstrated in U.S. Pat. Nos. 4,348,524 and 4,191,683.

The 4-amino-2,2,6,6-tetralkylpiperidines or their 1-substituted derivatives may be added to alkyl acrylates and methacrylates via Michael Addition to form 2,2,6,6-tetraalkyl-4-piperidinyl substituted propionates or 2-methylpropionates which are then reacted with a hydrazine to form the corresponding hydrazide. Alkylation or acylation of the hindered nitrogen of the intermediate ester may be carried out if desired prior to the hydrazinolysis step. These techniques are also demonstrated in U.S. Pat. No. 4,223,147.

The semicarbazide derivatives are prepared by reacting the 4-amino-2,2,6,6-tetraalkylpiperidines or their 1-substituted derivatives with diphenyl carbonate and then reacting the resulting phenyl carbamate with a hydrazine. Again substitution on the hindered nitrogen may be performed on the intermediate phenyl carbamate prior to the hydrazinolyis step. This technique is also demonstrated in U.S. Pat. No. 4,223,147.

Hydrazido functionalized hindered amine light stabilizers may also be prepared by reacting halosubstituted esters such as lower alkyl chloroacetates or bromopropionates with 4-amino or 4-hydroxy-2,2,6,6-tetraalkylpiperidines to form the HALS substituted acetates or propionates (U.S. Pat. Nos. 4,578,472 and 4,618,634) which are readily converted to the corresponding hydrazides with a hydrazine.

The carbazate derivatives are prepared by reacting a 4-hydroxy-2,2,6,6-tetraalkylpiperidine or a 1-substituted derivative with phosgene or phenyl chloroformate in the presence of a base to form the symmetrical carbonate or the phenyl carbonate respectively. Again, substitution on the hindered nitrogen (if unsubstituted) may be effected at this point if desired. Hydrazinolysis of the carbonate or the phenyl carbonate using little or no excess hydrazine will produce the 2,2,6,6-tetraalkyl-4-piperidinyl carbazate (or its 1-substituted derivative). 4-Hydroxy-2,2,6,6-tetramethylpiperidin-4-ol and 4-hydroxy-1,2,2,6,6-pentamethylpiperidin-4-ol are both available from Huls Chemische Werke.

Hydrazido functionalized hindered amine light stabilizers containing oxyl substituents on the hindered nitrogen are prepared by reacting the corresponding unsubstituted hindered nitrogen with a peracid or hydrogen peroxide in the presence of tungsten catalysts (U.S. Pat. No. 4,348,524). The oxidation of the unsubstituted hindered amine to the oxyl radical is preferably carried out on the various intermediates prior to the hydrazinolysis step. The oxyl radical may be converted to a hydroxyl radical in the presence of a hydrogen radical donor.

c. Other UV Stabilizers

The photoresistant composition may further comprise a UV stabilizer for improved performance in UV stabilization. UV stabilizers disperse the UV radiation energy by absorbing the energy through reversible chemical rearrangements such as hydrogen shifts.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morpholino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octloxybenzophenoe (UVINUL® 3008), 6-tert-butyl-2-(5-chloro-2H-benzotriazole-2-yl)-4-methylphenyl (UVINUL® 3026), 2,4-di-tert-butyl-6-(5-chloro-2H-benzotriazole-2-yl)-phenol (UVINUL® 3027), 2-(2H-benzotriazole-2-yl)-4,6-di-tert-pentylphenol (UVINUL® 3028), 2-(2H-benzotriazole-2-yl)-4-(1,1,3,3-tetramethylbutyl)-phenol (UVINUL® 3029), 1,3-bis[(2'cyano-3',3'-diphenylacryloyl)oxy]-2,2-bis-{[(2'-cyano-3',3'-diphenylacryloyl)oxy]methyl}-propane (UVINUL® 3030), 2-(2H-benzotriazole-2-yl)-4-methylphenol (UVINUL® 3033), 2-(2H-bezhotriazole-2-yl)-4,6-bis(1-methyl-1-phenyethyl)phenol (UVINUL® 3034), ethyl-2-cyano-3,3-diphenylacrylate (UVINUL® 3035), (2-ethylhexyl)-2-cyano-3,3-diphenylacrylate (UVINUL® 3039), N,N'-bisformyl-N,N'-bis(2,2,6,6-tetramethyl-4-piperidinyl) hexamethylenediamine (UVINUL® 4050H), bis-(2,2,6,6-tetramethyl-4-piperidyl)-sebacate (UVINUL® 4077H), bis-(1,2,2,6,6-pentamethyl-4-piperidyl)-sebacate+methyl-(1,2,2,6,6-pentamethyl-4-piperidyl)-sebacate (UVINUL® 4092H) or combination thereof.

(1) Benzotriazoles

The UV stabilizer may be benzotriazoles. Benzotriazoles have the general structure of formula:

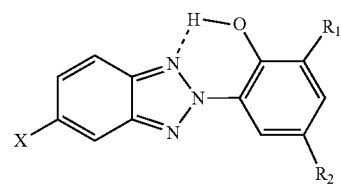

wherein R1 is selected from the group consisting of hydrogen, alkyl, aryl, substituted alkyls, substituted aryls and R2 is selected from the group consisting of hydrogen, alkyl, aryl, substituted alkyls, substituted aryls.

Benzotriazoles have absorbance maxima at about 295 nm ($\epsilon\sim14,000$) and 345 nm ($\epsilon\sim16,000$). Benzotriazoles may have a fairly sharp cutoff in absorbance maxima so that there is little tailing into the visible and little yellow color. These compounds may also be substituted adjacent to the hydroxyl group to increase steric hinderance and ensure that the polymer does not contain basic residues that catalyze transesterification with polycarbonates. Benzotriazoles may be synthesized as shown in Scheme 1. An alkyl group must be para to the hydroxyl group of the phenol in order to avoid coupling at that position and the hydroxyl group must be free.

hydroxyl group in the 4 position. Both of these groups reduce colorization and provide good photostability. The most common derivatives of benzophenones are the 4-methoxy and 4-octyloxy esters. The 2-hydroxy-4-alkoxybenzophenones are synthesized by Friedel-Crafts coupling of benzoic acid or tricholortoluene onto resorcinol followed by selective alkylation of the 4-hydroxy group as shown in Scheme 2.

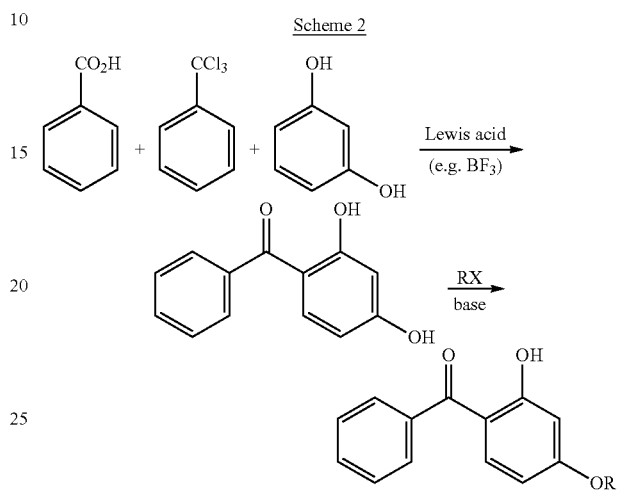

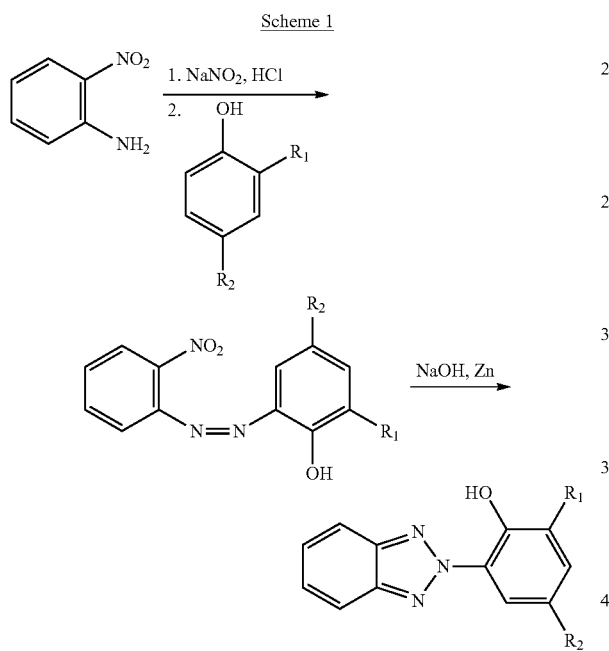

Exemplary, but not exclusively, benzotriazole UV stabilizers include CYASORB® 5411 or TINUVIN® 234.

(2) Benzophenones

The UV stabilizer may be a benzophenone. Benzophenones have the general structure of formula:

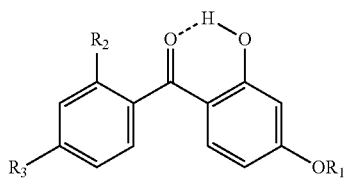

wherein R2 is any one of the following hydrogen, alkyl, aryl, substituted alkyls, substituted aryls and R3 is any one of the following hydrogen, alkyl, aryl, substituted alkyls, substituted aryls.

Benzophenones have absorbance maxima at about 285 nm ($\epsilon\sim15,000$) and 325 nm ($\epsilon\sim10,000$). Benzophenones have a long tail in absorbance maxima and create a slightly yellow color in compounds containing benzophenones. The benzophenones may have a 2-hydroxy group and an alkoxy or Exemplary, but not exclusively, benzophenone UV stabilizers include CYASORB® 24, UVINUL® 3049 and UVINUL® 3050, Exemplary, but not exclusively, benzophenone UV stabilizers include CYASORB® 24, UVINUL® 3049 and UVINUL® 3050:

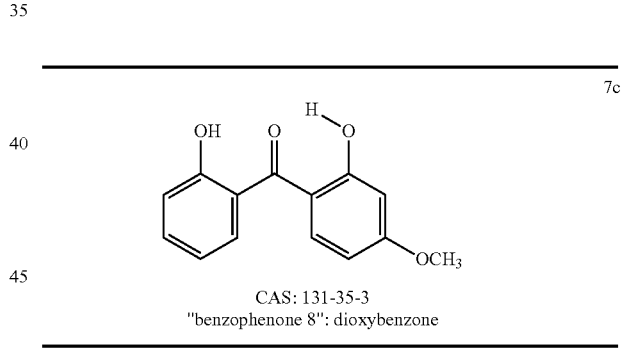

7c

CAS: 131-35-3
"benzophenone 8": dioxybenzone

| MW 244 | Cyasorb UV-24 (Cytec) |
| mp 68 | Maxgard 900 (Lycus) |
| Av: C | Helisorb 8 (Norquay) |
| UV | |

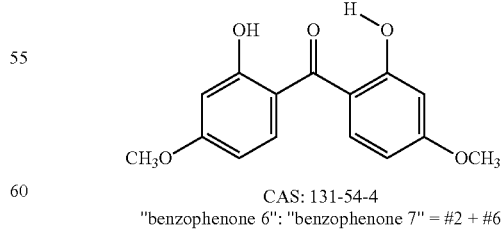

7f

CAS: 131-54-4
"benzophenone 6": "benzophenone 7" = #2 + #6

| MW 274 | Uvinul 3049; Uvinul D-49 (BASF) |
| mp 130 | See generic list |
| Av: C | |
| UV | Uvinul 3093, M-493, 490 = Mixed 3050 and 3094 |

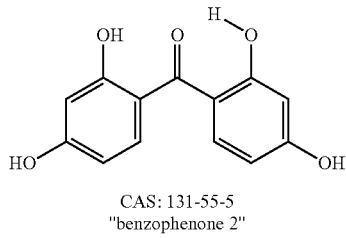 [SMILES: O=C(c1ccc(O)cc1O)c1ccc(O)cc1O]

CAS: 131-55-5
"benzophenone 2"

| MW 246 | Uvinul 3050; Uvinul D-50 (BASF) |
| mp 195 | see generic list |
| Av: C | |

(3) Cyanoacrylates

The UV stabilizer may be a cyanoacrylate. Cyanoacrylates have the general structure of formula:

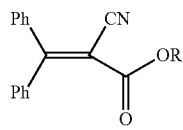

Cyanoacrylates have a single absorbance maximum at about 300 nm ($\epsilon$~15,000) resulting in less absorption at longer wavelengths than benzotriazoles or benzophenones. Cyanoacrylates may be prepared by a Knoevenagel condensation of ethyl cyanoacetate with benzophenone followed by transesterification as shown in Scheme 3.

Scheme 3

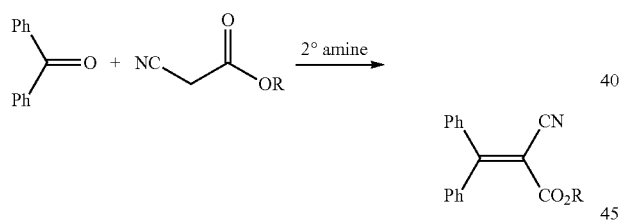

Exemplary, but not exclusively, cyanoacrylate UV stabilizers include UVINUL® 3030 and UVINUL® 3059. UVINUL® 3030 is a UV absorber form BASF with the chemical name 1,3-bis-[2'-cyano-3'3-diphenylacryloyl)oxy]-2,2-bis-{[2-cyano-3',3'-diphenylacryloyboxy]methyl}propan. UVINUL® 5050H is an oligomeric sterically hindered amine from BASF. Its molecular weight is approximately 3500 g/mol.

(4) Triazines

The UV stabilizer may be a triazine. Triazines have the general structure of formula:

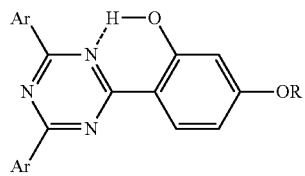

wherein R is an alkyl, substituted alkyl.

Triazines have an absorption maxima at 290 nm ($\epsilon$~43,000) and at about 340 nm ($\epsilon$~23,500). Triazines have a high extinction coefficient and high molecular weights. Triazine UVA's are synthesized by treating cyanuric chloride with m-xylene and aluminum chloride to make the di-arylated triazine according to Scheme 4.

Scheme 4

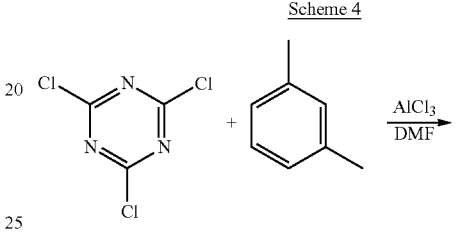

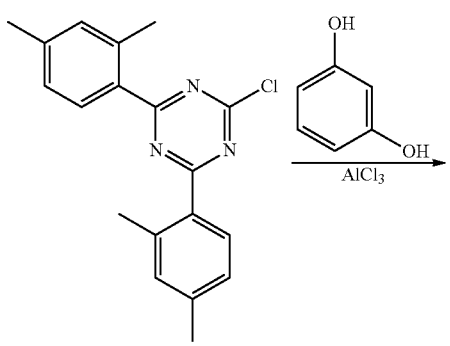

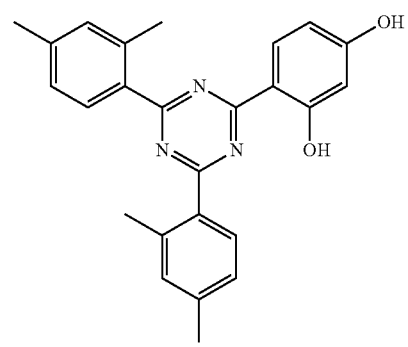

The diaryl triazine is then treated with resorcinol and aluminium chloride to make the dihydroxyphenyl triazine, which is the converted to ether. Triazines may be used in coating applications because they are not very soluble, but have an improved photostability in automotive coatings.

Exemplary triazine UV stabilizers include, but not exclusively, TINUVIN® 400, CYASORB® 1164L and TINUVIN® 234:

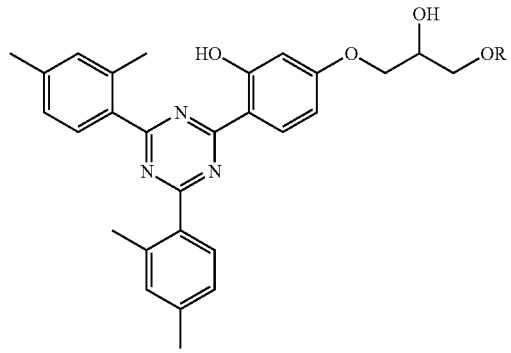

CAS: 153519-44-9
R = C$_{12}$H$_{25}$, C$_{13}$H$_{37}$
85% m 1-methoxy-2-propanol

| MW ~ 647 | Tinuvin 400 (Ciba) |
| mp oil | Tinuvin 400-2 (coatings grade) |
| Av: C | |

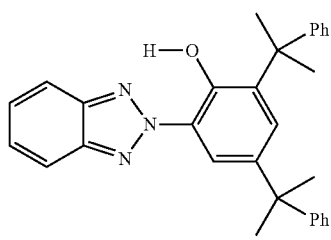

CAS: 70321-86-7

| MW 447.6 | Tinuvin 234 (Ciba) |
| mp 135-43 | Tinuvin 900 (Ciba) |
| Av: C | see generic list |
| UV | |

(5) Oxanilides

The UV stabilizer may be an oxanilide. Oxanilides have the general structure of formula:

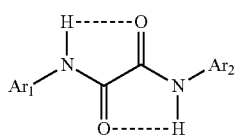

Oxanilides have similar absorption characteristics as cyanoacrylates and may be asymmetrically substituted to broaden the absorption band and improve solubility.

(6) CYASORB® 5411, CYASORB® UV-3638, UVINUL® 3030, and TINUVIN® 234

The UV stabilizer may be:

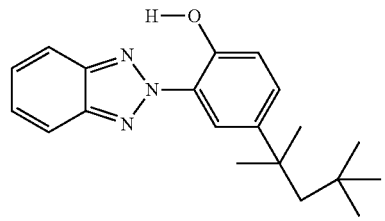 [SMILES: CC(C)(C)CC(C)(C)c1ccc(O)c(-n2nc3ccccc3n2)c1]

(also known as CYASORB® 5411 (Cytec) or TINUVIN® 329 (Ciba) (MW 323.4; mp 101-105)), or

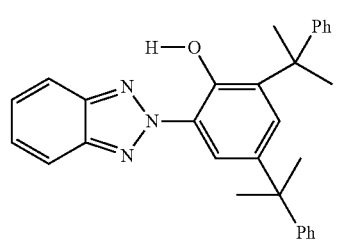 [SMILES: CC(C)(c1ccccc1)c1cc(-n2nc3ccccc3n2)c(O)c(C(C)(C)c2ccccc2)c1]

(also known as TINUVIN® 234 (Ciba) or TINUVIN® 900 (Ciba) (MW=447.6; mp=135-143), or

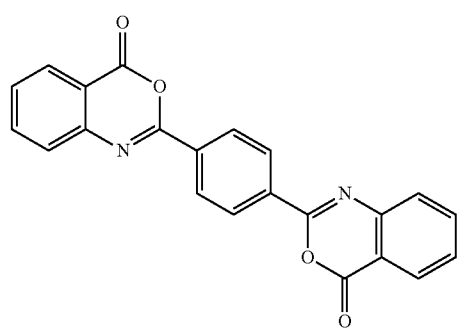 [SMILES: O=c1oc(-c2ccc(-c3nc4ccccc4c(=O)o3)cc2)nc2ccccc12]

CYASORB® UV-3638), or

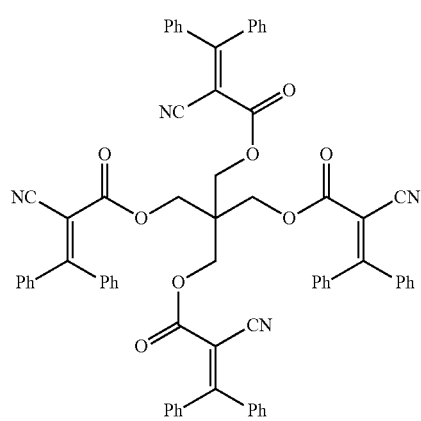 [SMILES: N#CC(C(=O)OCC(COC(=O)C(C#N)=C(c1ccccc1)c1ccccc1)(COC(=O)C(C#N)=C(c1ccccc1)c1ccccc1)COC(=O)C(C#N)=C(c1ccccc1)c1ccccc1)=C(c1ccccc1)c1ccccc1]

(UVINUL® 3030).

The photoresistant composition may comprise one or more UV stabilizers, excluding CYASORB® 5411, CYASORB® UV 3638, UVINUL® 3030, and/or TINUVIN® 234.

d. Impact Modifiers

The photoresistant composition may further comprise impact modifiers. For example, the composition can further include impact modifier(s), with the proviso that the additives are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

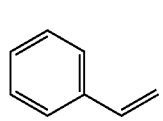 Styrene 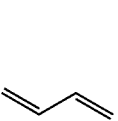 Butadiene 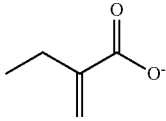 Methylmethacrylate

SEBS may be a linear triblockcopolymer based on styrene and ethylene/butylene. Each copolymer chain that may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of copolycarbonate, polysiloxane-polycarbonate, and any additional polymer. Impact modifiers may include MBS and SBS.

e. Other Additives

The photoresistant composition may further comprise other additives such as, but not limited to, pigments, dyes, heat stabilizers, release agents, etc. Specific additives include antioxidants, such as antioxidant 1076; polyethylene terephthalates (PETS); NaOH, titanium dioxide, coated titanium dioxide, copper phthalocyanine pigment blue, pigment blue 28, and pigment red 101. The composition may have a weight percent of each of these other additives of between 0.00010 and 0.5%. For example, the antioxidant may be present in a range of between 0.1 and 0.6 weight %; the polyethylene terephthalate may be present in a range of between 0.1 and 0.5 weight %; the NaOH, such as NaOH 33% in water, may be present in a range of between 0.01 and 0.05 weight %; the titanium dioxide, which may be coated, may be present in a range of between 2 and 6 weight %; the copper phthalocyanine pigment blue (15:4) may be present in a range of between 0.0001 and 0.003 weight %; the pigment blue 28 may be present in a range of 0.01 and 0.05 weight %; the pigment red 101 may be present in a range of 0.002 and 0.015 weight %.

Colorants such as pigment and/or dye additives can be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly(C2-8) olefin dyes; carbocyanine dyes; indanthrone dyes; phthalocyanine dyes; oxazine dyes; carbostyryl dyes; naphthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5- diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinoline-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylene-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the thermoplastic composition.

Various types of flame retardants can also be utilized as additives. In one embodiment, the flame retardant additives include, for example, flame retardant salts such as alkali metal salts of perfluorinated C1-16 alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as Na2CO3, K2CO3, MgCO3, CaCO3, and BaCO3 or fluoro-anion complex such as Li3AlF6, BaSiF6, KBF4, K3AlF6, KAlF4, K2SiF6, and/or Na3AlF6 or the like. Rimar salt and KSS, alone or in combination with other flame retardants, are particularly useful in the polycarbonate compositions disclosed herein.

In another embodiment, the flame-retardants are selected from at least one of the following: alkali metal salts of perfluorinated C1-16 alkyl sulfonates; potassium perfluorobutane sulfonate; potassium perfluoroctane sulfonate; tetraethylammonium perfluorohexane sulfonate; and potassium diphenylsulfone sulfonate.

In another embodiment, the flame retardant is not a bromine or chlorine containing composition.

In another embodiment, the flame retardant additives include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula (GO)3P=O, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis (dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful as additives, for example, compounds of the formulas below:

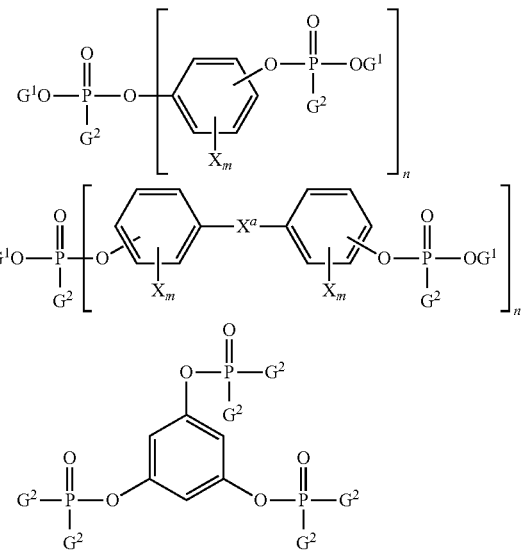

wherein each G1 is independently a hydrocarbon having 1 to 30 carbon atoms; each G2 is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phosphine oxide.

Halogenated organic flame retardant compounds can also be used as flame retardants, for example halogenated flame retardant compounds of formula:

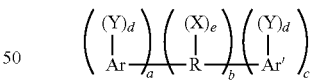

wherein R is a C1-36 alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (20) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula (R2SiO)y wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3, 3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt. %, more specifically 0.02 to 5 wt. %, based on 100 parts by weight of the polymer component of the thermoplastic composition.

In addition to the endcapped polycarbonate and flame retardant (and any impact modifier, if used), the thermoplastic composition can include various additives ordinarily incorporated in polycarbonate compositions of this type, with the proviso that the additives are selected so as to not significantly adversely affect the desired properties of the polycarbonate, for example, transparency and flame retardance. Combinations of additives can be used. Such additives can be mixed at a suitable time during the mixing of the components for forming the composition.

Various additives can be incorporated into the composition of matters encompassed by this disclosure/claimed invention.

In one embodiment, one or more additives are selected from at least one of the following: UV stabilizing additives, thermal stabilizing additives, mold release agents, colorants, organic and inorganic fillers, and gamma-stabilizing agents.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as TiO2, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the composition.

Exemplary antioxidant additives include, for example, organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weigh of the polymer component of the thermoplastic composition (excluding any filler).

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the polymer component of the thermoplastic composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxy-carbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the thermoplastic composition.

The term "antistatic agent" refers to monomeric, oligomeric, or polymeric materials that can be processed into polymer resins and/or sprayed onto materials or articles to improve conductive properties and overall physical performance. These monomeric, oligomeric, or polymeric materials may also be used as additives. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.0001 to 5 parts by weight, based on 100 parts by weight of the polymer component of the thermoplastic composition.

Where a foam is desired, useful blowing agents may be used as additives and include, for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4'oxybis(benzenesulfonylhydrazide), sodium bicarbonate, ammonium carbonate, or the like, or combinations comprising at least one of the foregoing blowing agents. Blowing agents are generally used in amounts of 0.01 to 20 parts by weight, based on 100 parts by weight of the polymer component of the thermoplastic composition.

Anti-drip agents can also be used in the thermoplastic composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the polymer component of the thermoplastic composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the polymer component of the thermoplastic composition.

3. Mixers and Extruders

Compositions comprising the HALS and isosorbide-polymers and alternatively, UV stabilizers and impact modifiers stabilizers can be manufactured by various methods. For example, HALS and isosorbide-polymers, and alternatively, UV stabilizers and impact modifiers stabilizers may be first blended in a high speed HENSCHEL-Mixer®. Other low shear processes, including but not limited to hand mixing, can also accomplish this blending. The blend may then be fed into the throat of a single or twin-screw extruder via a hopper. The extruder may be a single-screw extruder, which may not be as harsh on the blend as a twin-screw extruder. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

4. Articles

Shaped, formed, or molded articles comprising the polymer compositions are provided herein. The compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. The compositions are of particular utility in the manufacture of thin walled articles such as housings for electronic devices. Additional examples of articles that can be formed from the compositions include any device for public use, electrical parts, such as relays, and enclosures, consumer electronics such as enclosures and parts for laptops, desktops, docking stations, PDAs, MP3 players, GPS modules, cell phones, cell phone cover or housing, desktop computers and computer housings, conventional phones, digital cameras, desktops, and telecommunications parts such as parts for base station terminals.

The present invention has multiple aspects, illustrated by the following non-limiting examples.

Example 1

HALS-Stabilized Polycarbonate

Several different polycarbonate resins containing UV absorbers and/or HALS compounds were screened for increased stability in the presence of UV irradiation. The compositions of these resins are shown in Tables 1a and 1b.

TABLE 1a

|  |  | batch #1 | sample #2 | sample #3 | sample #4 | sample #5 | sample #6 | sample #7 | sample #8 | sample #9 |
|---|---|---|---|---|---|---|---|---|---|---|
| Isosorbide polycarbonate copolymer 1 | % | 93.27 | 93.27 | 93.27 | 93.27 | 93.27 | 93.27 | 93.27 | 93.27 | 93.27 |
| MBS impact modifier | % | 6 | 6 | 6 | 6 | 6 | 6 | 6 | 6 | 6 |
| Antioxidant 1076 | % | 0.4 | 0.4 | 0.4 | 0.4 | 0.4 | 0.4 | 0.4 | 0.4 | 0.4 |
| PETS | % | 0.3 | 0.3 | 0.3 | 0.3 | 0.3 | 0.3 | 0.3 | 0.3 | 0.3 |

TABLE 1a-continued

|  |  | batch #1 | sample #2 | sample #3 | sample #4 | sample #5 | sample #6 | sample #7 | sample #8 | sample #9 |
|---|---|---|---|---|---|---|---|---|---|---|
| NaOH, 33% in H2O | % | 0.03 | 0.03 | 0.03 | 0.03 | 0.03 | 0.03 |  | 0.03 | 0.03 |
| Coated Titanium Dioxide | % | 4 | 4 | 4 | 4 | 4 | 4 | 4 | 4 | 4 |
| Pigment blue 28 | % | 0.032 | 0.032 | 0.032 | 0.032 | 0.032 | 0.032 | 0.032 | 0.032 | 0.032 |
| Copper Phthalocyanine Pigment Blue 15:4 | % | 0.00017 | 0.00017 | 0.00017 | 0.00017 | 0.00017 | 0.00017 | 0.00017 | 0.00017 | 0.00017 |
| Pigment Red 101 | % | 0.008 | 0.008 | 0.008 | 0.008 | 0.008 | 0.008 | 0.008 | 0.008 | 0.008 |
| UVA 234 | % |  | 0.15 |  |  |  |  |  |  |  |
| UVA 5411 | % |  |  | 0.15 |  |  |  |  | 0.15 |  |
| CYASORB UV-3638 | % |  |  |  | 0.15 |  |  |  |  | 0.15 |
| HALS 770 | % |  |  |  |  | 0.15 |  | 0.15 | 0.15 | 0.15 |
| Uvinul 3030 | % |  |  |  |  |  | 0.15 |  |  |  |

TABLE 1b

|  |  | sample #10 | sample #11 | sample #12 |
|---|---|---|---|---|
| Polycarbonate resin 1, MVR 6 | % | 4.65 | 4.65 | 46.30 |
| Polycarbonate resin 2, MVR 26 | % | 70.8 | 70.8 | 22.81 |
| SAN copolymer 1 | % |  |  | 5.93 |
| SAN copolymer 2 | % | 12 | 12 |  |
| ABS copolymer 1 | % |  |  | 19.76 |
| ABS copolymer 2 | % | 12 | 12 |  |
| MBS impact modifier | % |  |  | 3.95 |
| Antioxidant 1076 | % | 0.15 | 0.15 | 0.5 |
| PETS | % | 0.3 | 0.3 | 0.4 |
| Tris(di-t-butylphenyl)phosphite | % | 0.1 | 0.1 | 0.1 |
| Coated Titanium Dioxide | % | 4 |  |  |
| Pigment blue 28 | % | 0.032 |  |  |
| Copper Phthalocyanine Pigment Blue 15:4 | % | 0.00017 |  |  |
| Pigment Red 101 | % | 0.008 | 0.0029 |  |
| Pigment Brown 24 | % |  | 0.0063 |  |
| Pigment Blue 29 | % |  | 0.0043 | 0.00075 |
| Titanium Dioxide | % |  | 4.65 | 4.75 |
| Eastobrite OB-1 | % |  |  | 0.018 |
| Pigment Yellow 53 | % |  |  | 0.00142 |
| Solvent Red 52 | % |  |  | 0.000043 |
| PELTP | % |  |  | 0.2 |
| UVA 5411 | % |  | 0.15 | 0.05 |

In Tables 1a and 1b, the percentages are weight or mass percentages.

Isosorbide polycarbonate copolymer 1 is a copolymer containing 80 mol % isosorbide, 13 mol % BPA and 7 mol % fatty acid dimer. The fatty acid dimer is available under the tradename Pripol 1009 from Croda Coatings & Polymers. The synthesis of the isosorbide polymer is described in U.S. Pat. No. 7,666,972 and patents referenced therein.

Polycarbonate 1 is a BPA polycarbonate grade from SABIC Innovative Plastics characterized by a melt volume rate (MVR) of 6 cm3/10 min (determined at 300° C., 1.2 kg according to ISO1133). Polycarbonate 2 is a BPA polycarbonate grade from SABIC Innovative Plastics characterized by a MVR of 26 cm$^3$/10 min (determined at 300° C., 1.2 kg according to ISO1133).

SAN copolymer 1 is a copolymer of styrene and acrylonitrile containing 25 w % acrylonitrile and a melt flow rate (MFR) of 6.2 g/10 min (determined at 190°, 2.16 kg).

SAN copolymer 2 is a copolymer of styrene and acrylonitrile containing 27 w % acrylonitrile and a melt flow rate (MFR) of 17 g/10 min (determined at 220°, 5.0 kg).

ABS copolymer 1 is a copolymer of acrylonitrile, butadiene and styrene containing 15 wt % acrylonitrile, 16 wt % butadiene and 69 wt % styrene with a MFR of 20 g/10 min (determined at 220°, 10.0 kg).

ABS copolymer 2 is a copolymer of acrylonitrile, butadiene and styrene containing 12 wt % acrylonitrile, 52 wt % butadiene and 36 wt % styrene with a MFR of 9.0 g/10 min (determined at 220°, 10.0 kg).

MBS impact modifier is a copolymer of methyl methacrylate, butadiene and styrene, having a glass transition temperature of −77° C. and an average particle size of 270 micrometer.

Antioxidant 1076 is an acronym for 3,5-Bis(1,1-dimethylethyl)-4-hydroxybenzenepropanoic acid octadecyl ester.

PETS is an abbreviation of pentaerythritol Stearate.

Coated Titanium Dioxide is a white pigment in which the particles have been coated with silica in order to prevent radicals from Titanium Dioxide to interact with the materials the pigment is dispersed in.

Pigment blue 28 is a blue pigment also known as Cobalt Blue or Cobalt aluminate spinel.

Copper Phthalocyanine Pigment Blue 15:4 is a blue pigment also known as Copper tetrabenzoporphyrazine.

Pigment Red 101 is a red pigment also known as Iron (III) oxide

Pigment Brown 24 is a brown pigment based on titanium oxide. In the rutile lattice, titanium ions are partially replaced by chromium (III) and antimony (V) ions.

Pigment Blue 29 is a blue pigment also known as Ultramarine blue with structure Na2OSAl2O3SiO2

Eastobrite OB-1 is an optical brightener from Eastman with the chemical name 2,2'-(1,2-Ethenediyldi-4,1-phenylene)bisbenzoxazole.

Pigment Yellow 53 is a yellow pigment based on titanium oxide. In the rutile lattice, titanium ions are partially replaced by nickel (II) and antimony (V) ions.

Solvent Red 52 is a red dye with the chemical name 3-Methyl-6-(p-toluidino)-3H-dibenz[f,ij]isoquinoline-2,7-dione.

UVA 234 is a UV absorber from the benzotriazole class with the chemical name 2-[2-hydroxy-3,5-di-(1,1-dimethylbenzyl)]-2H-benzotriazol. A commercial name is TINUVIN® 234.

UVA 5411 is a UV absorber from the benzotriazole class with the chemical name 2-(2'-Hydroxy-5'-octylphenyl)-benzotriazol. A commercial name is CYASORB®UV-5411

CYASORB® UV-3638 is a UV light absorber with the chemical name 4H-3,1-benzoxazin-4-one, 2,2'-(1,4-phenylene)bis.

HALS 770 is a hindered amine light stabilizer with the chemical name bis(2,2,6,6-tetramethyl-4-piperidyl)sebacate.

UVINUL® 3030 is a UV absorber from BASF with the chemical name 1,3-bis-[2'-cyano-3',3-diphenylacryloyl)oxy]-2,2-bis-{[2-cyano-3',3'-diphenylacryloyl)oxy] methyl}propane.

PELTP is an antioxidant with the chemical name Pentaerythritol tetrakis(3-laurylthiopropionate).

UV aging tests confirmed that HALS, and in particular HALS770, impart significant stability to polycarbonate resin. See Table 2. The ΔE values are a measure of the color difference between a color plaque of that material before and after the UV exposure test. The test was executed on plaques molded under 'standard' and 'abusive' conditions. Both values are reported in the table.

Example 2

HALS-Stabilized Polycarbonate

Several different polycarbonate resins containing UV absorbers and/or HALS compounds were screened for increased stability in the presence of UV irradiation. See

TABLE 2

| # | Description | Comment | ΔE (STD) | ΔE (ABU) |
|---|---|---|---|---|
| 1 | isosorbide based reference composition | White colored isosorbide based composition with a good combination of impact resistance, heat resistance, humidity resistance and flow. ~60% biocontent. | 1.90 | 2.50 |
| 2 | sample #1 with UVA234 | evaluate UVA234, a common UV additive for polycarbonate compositions | 1.13 | 1.99 |
| 3 | sample #1 with UVA5411 | evaluate UVA5411, a common UV additive for polycarbonate compositions | 1.43 | 2.06 |
| 4 | sample #1 with Cyasorb UV3638 | evaluate Cyasorb UV3638, a UV additive that does not have free OH groups that may react with other ingredients | 3.35 | 4.46 |
| 5 | sample #1 with HALS770 | evaluate HALS | 0.62 | 1.89 |
| 6 | sample #1 with Uvinul 3030 | evaluate Uvinul 3030, a UV additive that does not have free OH groups that may react with other ingredients | 1.97 | 2.46 |
| 7 | sample #1 with HALS 770 no base | isosorbide compositions are stabilized by adjusting the acidity of the composition with NaOH (see table 1) conform U.S. Pat. No. 7,659,359. The HALS itself being basic, NaOH was left out of the formulation in order to avoid potentially too high basicity. | 4.02 | 4.64 |
| 8 | sample #1 with HALS 770 and UVA5411 | investigate if any synergy exists between HALS (sample #7) and UVA5411 (sample #3) | 0.80 | 1.52 |
| 9 | sample #1 with HALS 770 and Cyasorb UV3638 | investigate if any synergy exists between HALS (sample #7) and UV3638 (sample #4) | 1.55 | 2.34 |
| 10 | high flow PC ABS composition | Reference composition based on (oil based) BPA polycarbonate resin using the color package of sample #1 | 1.02 | 1.82 |
| 11 | high flow PC ABS composition | Reference composition based on (oil based) BPA polycarbonate resin using a traditional color package for such compositions | 1.19 | 2.40 |
| 12 | PC ABS composition | Reference composition based on (oil based) BPA polycarbonate resin using a color package known to lead to high UV color stability. | 2.61 | 2.95 |

Molding of the isosorbide based compositions (sample #1-9) was done after drying the material for 4 hrs at 85° C. in an air circulating oven and using a barrel temperature of 250° C. and a residence time of 120 s (standard condition) or using a barrel temperature of 270° C. and a residence time of 720 s (abusive condition). The control samples (sample #10-12) were dried for 4 hrs at 100° C. in an air circulating oven and then molded using a barrel temperature of 270° C. and a residence time of 120 s (standard condition) or using a barrel temperature of 290° C. and a residence time of 720 s (abusive condition).

ASTM G154 aging test was administered for 96 hours. While resins containing UVA234 (sample #2) or UVA5411 (sample #3) (see Table 2) showed some improvement, resins containing HALS770 alone (sample #5) or in combination with UVA5411 (sample #8) (see Table 2), exhibited significant improvement. HALS770 alone provided the best UV protection for a standard molded isosorbide polycarbonate (sample #1). Sample #1 with HALS770, with no base present (sample #7), provides no UV protection. See Table 2. The UV stabilizers present in the compositions tested in Table 2 are shown below in Table 2. Each UV stabilizer and HALS770 was present at 0.15%.

Tables 3ab and 4. The ΔE values are a measure of the color difference between a color plaque of that material before and after the UV exposure test. The test was executed on plaques molded under 'standard' and 'abusive' conditions. Both values are reported in the table. It was found that the standard deviation in ΔE over a longer period of time (multiple test periods) was significantly higher (~0.3) than the standard deviation on a particular sample within a particular test sequence/sample set. Therefore a comparison of ΔE values between examples 1 and 2 is not desired.

Molding of the isosorbide based compositions (sample #14-24) was done after drying the material for 4 hrs at 85° C. in an air circulating oven and using a barrel temperature of 250° C. and a residence time of 120 s (standard condition) or using a barrel temperature of 270° C. and a residence time of 720 s (abusive condition). The control samples (sample #13) were dried for 4 hrs at 100° C. in an air circulating oven and then molded using a barrel temperature of 270° C. and a residence time of 120 s (standard condition) or using a barrel temperature of 290° C. and a residence time of 720 s (abusive condition). The compositions of these resins assayed in FIG. 2 are shown in Table 3.

With respect to Table 4, sample #13 is a control non-isosorbide polycarbonate blend. Sample #14 is a non-HALS isosorbide polycarbonate and shows UV degradation in both standard and abusive molded samples. Samples #15 and #16 compare HALS 770 alone and with a UV stabilizer and again, shows that HALS alone out performs in both the standard and abusive molded samples. Samples #17-19 show the effects of alternative HALS (alternative to HALS770). The other HALS components shows similar performance. They included HALS5050H (#17), HALS(3529) (#18), and HALS (3346) (#19). In sample #20, a higher loading of HALS770 is evaluated (0.3%), but this does not further improve the UV performance (compare to ΔE=0.80 for sample #15 with 0.15% HALS). Samples #21-#24 show the effects of different impact modifiers on the UV performance of HALS770 containing isosorbide polymers. SEBS impact modifier improved the UV protection with HALS770 significantly (samples #23 and #24) and provided superior color stability similar to a traditional PC ABS product (sample #13).

All percentages refer to weights unless otherwise stated. The above-identified samples, and samples shown in other tables contained herein, may contain more than 100 weight percent of total components. See samples 14, 23 and 24, for example (~104 wt %). The components in this table which have not been detailed near tables 1a and b and which are not self explanatory are described below:

Polycarbonate PDMS block copolymer is a block copolymer consisting of BPA carbonate repeat units and polydimethylsiloxane blocks which have been copolymerized. The PDMS content is approximately 20 wt %.

Acrylate siloxane impact modifier is a material based on silicone acrylic rubber and is available from Mitsubishi Rayon under the tradename Metablen SX005.

SEBS impact modifier is a linear copolymer based on styrene and ethylene/butylene with a polystyrene content of 33%. Each copolymer chain consists of three blocks: a middle TABLE 3a

|  |  | sample #13 | sample #14 | sample #15 | sample #16 | sample #17 | sample #18 | sample #19 |
|---|---|---|---|---|---|---|---|---|
| Isosorbide polycarbonate copolymer 1 | % |  | 93.27 | 93.09 | 92.93 | 93.09 | 93.09 | 93.09 |
| Polycarbonate resin 1, MVR 6 | % | 4.65 |  |  |  |  |  |  |
| Polycarbonate resin 2, MVR 26 | % | 70.80 |  |  |  |  |  |  |
| SAN copolymer 2 | % | 12 |  |  |  |  |  |  |
| ABS copolymer 2 | % | 12 |  |  |  |  |  |  |
| MBS impact modifier | % |  | 6 | 6 | 6 | 6 | 6 | 6 |
| phosphorous acid, 45% | % | 0.003 |  |  |  |  |  |  |
| Tris(di-t-butylphenyl)phosphite | % | 0.1 |  |  |  |  |  |  |
| Antioxidant 1076 | % | 0.15 | 0.4 | 0.4 | 0.4 | 0.4 | 0.4 | 0.4 |
| PETS | % | 0.3 | 0.3 | 0.3 | 0.3 | 0.3 | 0.3 | 0.3 |
| NaOH, 33% in H2O | % |  | 0.03 | 0.03 | 0.03 | 0.03 | 0.03 | 0.03 |
| Coated Titanium Dioxide | % | 4 | 4 | 4 | 4 | 4 | 4 | 4 |
| Copper Phthalocyanine Pigment Blue 15:4 | % | 0.00017 | 0.00017 | 0.00017 | 0.00017 | 0.00017 | 0.00017 | 0.00017 |
| Pigment blue 28 | % | 0.032 | 0.032 | 0.032 | 0.032 | 0.032 | 0.032 | 0.032 |
| Pigment Red 101 | % | 0.008 | 0.008 | 0.008 | 0.008 | 0.008 | 0.008 | 0.008 |
| UVA 5411 | % |  |  |  | 0.15 |  |  |  |
| HALS 770 | % |  |  | 0.15 | 0.15 |  |  |  |
| Uvinul 5050H | % |  |  |  |  | 0.15 |  |  |
| Cyasorb 3529 | % |  |  |  |  |  | 0.15 |  |
| Cyasorb 3346 | % |  |  |  |  |  |  | 0.15 |

TABLE 3b

|  |  | sample #20 | sample #21 | sample #22 | sample #23 | sample #24 |
|---|---|---|---|---|---|---|
| Isosorbide polycarbonate copolymer 1 | % | 93.09 | 92.00 | 93.09 | 93.09 | 93.09 |
| MBS impact modifier | % | 6 |  |  |  |  |
| polycarbonate PDMS block copolymer | % |  | 8 |  |  |  |
| acrylate siloxane impact modifier | % |  |  | 6 |  |  |
| SEBS impact modifier | % |  |  |  | 6 | 6 |
| Antioxidant 1076 | % | 0.4 | 0.4 | 0.4 | 0.4 | 0.4 |
| PETS | % | 0.3 | 0.3 | 0.3 | 0.3 | 0.3 |
| NaOH, 33% in H2O | % | 0.03 | 0.03 | 0.03 | 0.03 | 0.03 |
| Coated Titanium Dioxide | % | 4 | 4 | 4 | 4 | 4 |
| Copper Phthalocyanine Pigment Blue 15:4 | % | 0.00017 | 0.00017 | 0.00017 | 0.00017 | 0.00017 |
| Pigment blue 28 | % | 0.032 | 0.032 | 0.032 | 0.032 | 0.032 |
| Pigment Red 101 | % | 0.008 | 0.008 | 0.008 | 0.008 | 0.008 |
| HALS 770 | % | 0.3 | 0.15 | 0.15 | 0.15 | 0.3 | block being a random ethylene/butylene copolymer surrounded by two blocks of polystyrene.

UVINUL® 5050H is a oligomeric sterically hindered amine from BASF. Its molecular weight is approximately 3500 g/mol.

CYASORB® 3529 is a hindered amine light stabilizer from Cytec with the chemical name 1,6-Hexanediamine, N,N'-bis(2,2,6,6-tetramethyl-4-piperidinyl)-, Polymers with morpholine-2,4,6-trichloro-1,3,5-triazin. Its molecular weight is approximately 1700 g/mol.

CYASORB® 3346 is a hindered amine light stabilizer from Cytec with the chemical name Poly[(6-morpholino-s-triazine-2,4-diyl)[2,2,6,6-tetramethyl-4-piperidyl)imino]-hexamethylene[(2,2,6,6-tetramethyl-4-piperidyl)imino]. Its molecular weight is approximately 1600 g/mol.

The UV stabilizers present in the compositions tested in Tables 3a and 3b are shown below in Table 4:

TABLE 4

| # | Description | Comment | ΔE (STD) | ΔE (ABU) |
|---|---|---|---|---|
| 13 | high flow PC ABS composition | Reference composition based on (oil based) BPA polycarbonate resin using the color package of sample #1 | 0.44 | 1.1 |
| 14 | isosorbide based reference composition | White colored isosorbide based composition with a good combination of impact resistance, heat resistance, humidity resistance and flow. ~60% biocontent. | 1.24 | 2.31 |
| 15 | sample #14 with HALS770 | evaluate HALS | 0.80 | 1.91 |
| 16 | sample #14 with HALS 770 and UVA5411 | investigate if any synergy exists between HALS (sample #7) and UVA5411 (sample #3) | 1.33 | 2.45 |
| 17 | sample #14 with 0.15% HALS 5050H | test a different HALS type | 1.19 | 2.63 |
| 18 | sample #14 with 0.15% alt. HALS (3529) | test a different HALS type | 0.75 | 1.67 |
| 19 | sample #14 with 0.15% alt. HALS (3346) | test a different HALS type | 0.77 | 2.01 |
| 20 | sample #14 with 0.30% HALS770 | test a different HALS level | 0.91 | 2.44 |
| 21 | sample #15 with PCST impact modifier | test a different type of impact modifier | 1.04 | 1.77 |
| 22 | sample #15 with SX005 impact modifier | test a different type of impact modifier | 2.55 | 3.46 |
| 23 | sample #15 with SEBS impact modifier | test a different type of impact modifier | 0.46 | 1.04 |
| 24 | sample #20 with SEBS impact modifier | test a different type of impact modifier & HALS level | 0.40 | 1.06 |

Hals 5050H showed roughly equal performance to the unstabilized reference material while the other samples showed an improved performance. See Table 4. HALS 5050H is the largest molecule of the four HALS shown in Table 5.

Alternative HALS and percent amount of HALS were studied in both standard and abusive molded samples of isosorbide polycarbonates. Again, UV protection delta E numbers show that HALS770 works similar to HALS 3529 and 3346 under standard conditions. HALS 5050H has a slightly lower UV protection profile under standard conditions than HAL 770, 3529 or 3346. A weight percent increase from 0.15% to 0.30% of HALS770 did not improve UV protection performance of either the standard or abusive molded isosorbide polycarbonate samples.

TABLE 5

| Description | Cas # | Trade Name | Supplier | Performance vs. Reference | Mw (g/mol) |
|---|---|---|---|---|---|
| HALS | 52829-07-9 | Uvinul 4077H | BASF | Better | 481 |
| HALS 5050H | 152261-33-1 | Uvinul 5050H | BASF | Equal | 3000-4000 |
| HALS 3529 | 193098-40-7 | Cyasorb UV-3529 | Cytec | Better | 1700 +/− 10% |
| HAALS 3346 | 082451-48-7 | Cyasorb UV-3346 | Cytec | Better | 1600 +/− 10% |

Example 3

HALS Showing No Improvement

TABLE 6

|  |  | sample #25 | sample #26 | sample #27 | sample #28 | sample #29 | sample #30 | sample #31 |
|---|---|---|---|---|---|---|---|---|
| Isosorbide polycarbonate copolymer 1 | % | 99.9977 | 99.6977 | 99.4977 | 99.3977 | 99.0977 | 99.3977 | 99.0977 |
| UVA 234 | % |  |  |  |  |  | 0.3 | 0.45 |
| UVA 5411 | % |  | 0.15 | 0.5 | 0.3 | 0.45 |  |  |
| HALS 770 | % |  | 0.15 |  | 0.3 | 0.45 | 0.3 | 0.45 |
| H$_3$PO$_3$ (45% in water) | % | 0.0023 | 0.0023 | 0.0023 | 0.0023 | 0.0023 | 0.0023 | 0.0023 |

All percentages in Table 6 refer to weight percentages. Components are described near table 1. H3PO3 is used in a 45% solution in water. The mass percentages in the table refer to the solution, not to the pure component.

Molding took place under standard conditions which are the same as the standard conditions described for examples 1 and 2.

Table 7 indicates a number of polycarbonate compositions in which no colorants or impact stabilizers are used. These transparent materials were subjected to the same UV aging test as the samples in example 1 and example 2. ΔE values are reported in table 7. Sample #25 is a reference material. It is the pure isosorbide based polycarbonate with a low amount of phosphorous acid as a stabilizer for the compounding and molding in order to prevent hydrolysis. In samples #26 and #28 to #31, the effect of HALS is evaluated in combination with a UV absorber. Sample #27 tests the effect of UV absorber alone. The low level of HALS770 (0.15%) in sample #26 comes out best. All samples show an improvement over the #25 reference.

TABLE 7

| # | Description | Comment | ΔE (STD) |
|---|---|---|---|
| 25 | reference biobased polycarbonate | biobased polycarbonate stabilized by phosphorous acid | 2.49 |
| 26 | sample #25 with low levels of HALS770 and UVA5411 | test combination of UV5411 and HALS770 which worked well in example 1 | 1.79 |
| 27 | sample #25 with UVA5411 | test UV absorber without HALS | 2.02 |
| 28 | sample #26 with medium loadings | test effect of loading | 1.87 |
| 29 | sample #28 with high loadings | test effect of loading | 1.97 |
| 30 | sample #25 with low levels of HALS770 and UV234 | test UV234 in combination with HALS | 2.20 |
| 31 | sample #30 with medium loadings | test effect of loading | 2.00 |

The invention claimed is:

1. A composition comprising:
(a) an isosorbide polycarbonate polymer; and
(b) bis(2,2,6,6-tetramethyl-4-piperidyl)sebacate.

2. The composition of claim 1, further comprising at least one of the following impact modifiers: styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), styrene-acrylonitrile (SAN), or combination thereof.

3. The composition of claim 2, wherein the impact modifier is MBS.

4. The composition of claim 2, wherein impact modifier is SEBS.

5. The composition of claim 2, further comprising at least one of the following UV stabilizers: hydroxybenzophenones, hydroxyphenyl benzotriazole, cyanoacrylate, oxanilide, hydroxyphenyl triazine or a combination thereof.

6. The composition of claim 1, wherein the bis(2,2,6,6-tetramethyl-4-piperidyl)sebacate is at a weight percent below 0.3%.

7. The composition of claim 1, wherein the isosorbide of the polymer is derived from at least one of the following isosorbides: 1,4:3,6-dianhydro-D-sorbitol; 2,6-dioxabicyclo[3.3.0]octan-4,8-diol; 1,4:3,6-dianhydro-D-glucitol; 2,3,3a,5,6a-hexahydrofuro[3,2-b]furan-3,6-diol, or an isomer thereof.

8. The composition of claim 1, wherein the polymer is a homopolymer.

9. The composition of claim 1, wherein the polymer is a copolymer.

10. The composition of claim 1, wherein the polycarbonate is

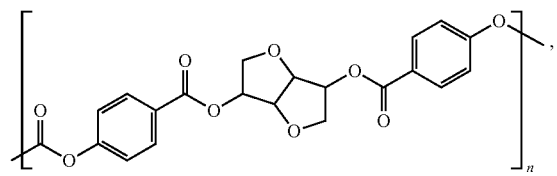

wherein n is greater than 1.

11. The polycarbonate of claim 1, wherein the polycarbonate is

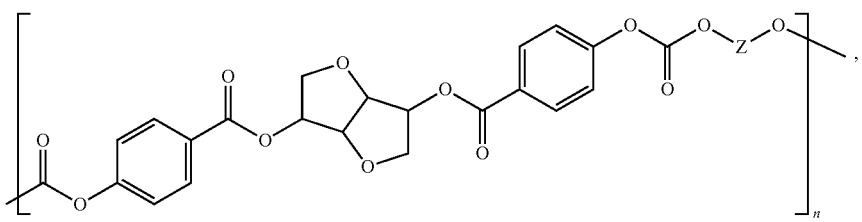

wherein z is an aromatic compound and n is greater than 1.

12. An article comprising the composition of claim 1.
13. A method of manufacturing an article comprising:
 (a) extruding the composition of claim 1; and
 (b) molding the extruded composition into an article.
14. The article formed from the method of claim 13.
15. The composition of claim 1, wherein the polymer comprises at least 20 weight of a biologically-based unit.
16. The composition of claim 15, wherein the biologically-based unit is isosorbide.
17. A composition comprising:
 (a) between 90 and 95 wt % isosorbide polycarbonate;
 (b) between 4 and 8 weight % SEBS impact modifier;
 (c) optionally between 0.1 and 0.6 wt % of an antioxidant;
 (d) optionally between 2 wt % and 6 wt % of titanium dioxide;
 (e) optionally between 0.1 and 0.5 wt % of plasticizers, lubricants and/or mold release agents and/or other additives; and
 (f) between 0.1 and 0.5 wt % of bis(2,2,6,6-tetramethyl-4-piperidyl)sebacate.
18. The composition of claim 17, wherein the composition comprises between 0.15 and 0.30 wt % of bis(2,2,6,6-tetramethyl-4-piperidyl)sebacate.
19. The composition of claim 17 further comprising between 0.01 and 0.05 wt % of a solution of 33 wt % NaOH in water.
20. An article comprising the composition of claim 16.
21. An article comprising the composition of claim 17.
22. An article comprising the composition of claim 18.
23. An article comprising the composition of claim 19.
24. The composition of claim 1, wherein the composition does not comprise the following UV stabilizers:

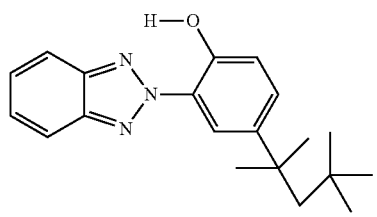 [SMILES: CC(C)(C)CC(C)(C)c1ccc(O)c(-n2nc3ccccc3n2)c1]

, or

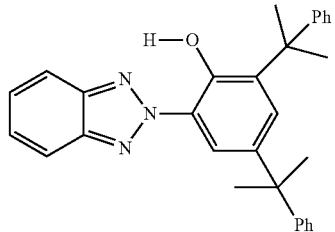 [SMILES: CC(C)(c1ccccc1)c1cc(-n2nc3ccccc3n2)c(O)c(C(C)(C)c2ccccc2)c1]

,

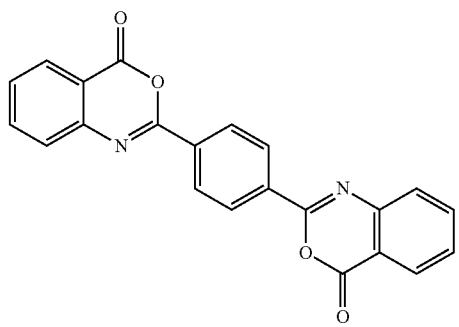 [SMILES: O=c1oc(-c2ccc(-c3nc4ccccc4c(=O)o3)cc2)nc2ccccc12]

, or

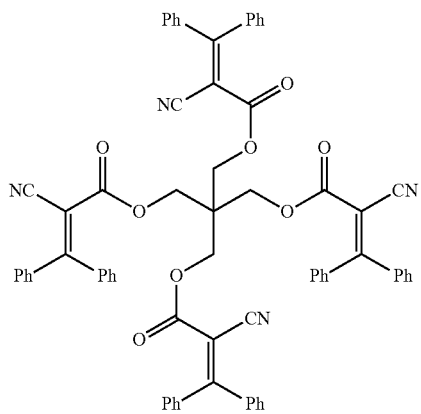 [SMILES: N#CC(C(=O)OCC(COC(=O)C(C#N)=C(c1ccccc1)c1ccccc1)(COC(=O)C(C#N)=C(c1ccccc1)c1ccccc1)COC(=O)C(C#N)=C(c1ccccc1)c1ccccc1)=C(c1ccccc1)c1ccccc1]

.

* * * * *